US008210724B2

(12) United States Patent
Ying

(10) Patent No.: US 8,210,724 B2
(45) Date of Patent: Jul. 3, 2012

(54) LOW GLARE LIGHTING FOR A TRANSIT VEHICLE

(75) Inventor: Jeffrey Ying, Glendora, CA (US)

(73) Assignee: I/O Controls Corporation, Azusa, CA (US)

(*) Notice: Subject to any disclaimer, the term of this patent is extended or adjusted under 35 U.S.C. 154(b) by 468 days.

(21) Appl. No.: 12/409,304

(22) Filed: Mar. 23, 2009

(65) Prior Publication Data
US 2009/0237950 A1 Sep. 24, 2009

Related U.S. Application Data

(60) Provisional application No. 61/039,097, filed on Mar. 24, 2008.

(51) Int. Cl.
B60Q 3/02 (2006.01)

(52) U.S. Cl. .......................... 362/479; 362/545; 362/490

(58) Field of Classification Search .................. 362/479, 362/471, 490, 545, 217.03, 217.04, 290, 362/291
See application file for complete search history.

(56) References Cited

U.S. PATENT DOCUMENTS

| 2,607,455 | A | * | 8/1952 | Yellin | 362/355 |
| 4,088,881 | A | | 5/1978 | Neer et al. | 362/223 |
| 4,157,584 | A | | 6/1979 | Bhatt | 362/74 |
| 4,209,822 | A | | 6/1980 | Goodbar | 362/19 |
| 4,387,415 | A | | 6/1983 | Domas | 362/74 |
| 4,574,336 | A | | 3/1986 | Mikalonis | 362/260 |
| 4,621,898 | A | | 11/1986 | Cohen | 350/276 |
| 4,625,267 | A | | 11/1986 | Mikalonis | 362/150 |
| 5,010,412 | A | | 4/1991 | Garriss | 358/240 |
| 5,014,167 | A | * | 5/1991 | Roberts | 362/494 |
| 5,113,322 | A | | 5/1992 | Mikalonis | 362/74 |
| 5,204,160 | A | | 4/1993 | Rouser | 428/167 |
| 5,219,217 | A | | 6/1993 | Aikens | 362/32 |
| 5,329,429 | A | * | 7/1994 | Mathias et al. | 362/490 |
| 5,420,763 | A | | 5/1995 | Vanderhoof | 362/74 |
| 5,441,326 | A | | 8/1995 | Mikalonis | 296/208 |
| 5,499,170 | A | | 3/1996 | Gagne | 362/84 |
| 5,595,432 | A | | 1/1997 | Vanderhoof | 362/74 |
| 5,752,760 | A | | 5/1998 | Dealey, Jr. et al. | 362/32 |
| 5,857,758 | A | | 1/1999 | Dealey, Jr. et al. | 362/32 |
| 6,082,879 | A | | 7/2000 | Mygurgh | 362/480 |
| 6,152,588 | A | | 11/2000 | Scifres | 362/496 |
| 6,161,910 | A | | 12/2000 | Reisenauer et al. | |

(Continued)

OTHER PUBLICATIONS

"Suburban OPR, We design innovative bus interiors," Pretoria Transit Interiors, Inc., printed Oct. 2007.

(Continued)

Primary Examiner — David V Bruce
(74) Attorney, Agent, or Firm — Irell & Manella LLP

(57) ABSTRACT

A low glare overhead lighting fixture for a transit vehicle comprises a lighting fixture base assembly for mounting one or more light sources (e.g., LEDs or fluorescent tubes), and a light permeable cover adapted to reduce glare. The light permeable cover may include a light guide embodied as a grid-like structure with holes or perforations for directing the light from the light source in a manner reducing light spread. The light guide may be disposed between a front and rear lens covers. The lighting fixture may also utilize a light permeable cover having an anti-glare surface element, such as a privacy filter screen or mesh which may be formed using microlouver technology. The lighting fixture base assembly may have separate compartments, each lined with a highly reflective coating, housing one or more deeply set LEDs.

27 Claims, 16 Drawing Sheets

U.S. PATENT DOCUMENTS

| | | | |
|---|---|---|---|
| 6,238,075 B1 | 5/2001 | Dealey, Jr. et al. | 362/551 |
| 6,244,715 B1 | 6/2001 | McCauley et al. | 359/601 |
| 6,350,048 B1 | 2/2002 | Stanton et al. | 362/478 |
| 6,398,370 B1 | 6/2002 | Chiu et al. | 359/613 |
| 6,402,353 B2 | 6/2002 | Dealey, Jr. et al. | 362/478 |
| 6,548,967 B1 | 4/2003 | Dowling et al. | 315/318 |
| 6,827,472 B1 | 12/2004 | Myburgh | 362/472 |
| 6,965,205 B2 | 11/2005 | Piepgras et al. | 315/318 |
| 7,167,103 B2 | 1/2007 | Warren et al. | 340/901 |
| 7,178,941 B2 | 2/2007 | Roberge et al. | 362/225 |
| 2002/0030374 A1 | 3/2002 | Myburgh | 296/37.7 |
| 2002/0159270 A1 | 10/2002 | Lynam et al. | 362/492 |
| 2004/0228135 A1 | 11/2004 | Myburgh | 362/480 |
| 2005/0265029 A1 | 12/2005 | Epstein et al. | 362/339 |
| 2006/0158591 A1 | 7/2006 | Trapani et al. | 349/119 |
| 2006/0245718 A1 | 11/2006 | Winston et al. | 385/147 |
| 2007/0025680 A1 | 2/2007 | Winston et al. | 385/146 |
| 2007/0036512 A1 | 2/2007 | Winston et al. | 385/147 |
| 2007/0054133 A1 | 3/2007 | Sherman et al. | 428/447 |
| 2007/0055019 A1 | 3/2007 | Sherman et al. | 525/193 |
| 2007/0084549 A1 | 4/2007 | Graham et al. | 156/245 |
| 2007/0160811 A1 | 7/2007 | Gaides et al. | 428/172 |

OTHER PUBLICATIONS

"Transit LF, We design innovative bus interiors," Pretoria Transit Interiors, Inc., printed Oct. 2007.
"Power Light Source Luxeon K2 Emitter," Technical Datasheet DS51, Lumileds Light from Silicon Valley, pp. 1-25, May 2006.
"3 M 58° Polarizing Light" brochure, printed Oct. 2007.
"3 M Singapore Office Solutions, Ergonomics Innovative Design," brochure, printed Oct. 2007.
"3 M Polarizing Task Light, Silver," brochure, printed Oct. 2007.
"3 M Vikuiti KE Polarizer," brochure, Mar. 2007.
Rall, Philip J. et al., "9.1: Intrinsic Polarizers—Ultra Durable Dichroic Polarizers for LCD Projection," May 2007.
"3M Computer Filters," 2008.

* cited by examiner

LOW GLARE LIGHTING FOR A TRANSIT VEHICLE

RELATED APPLICATION INFORMATION

This application claims the benefit of U.S. Provisional Application Ser. No. 61/039,097, filed on Mar. 24, 2008, hereby incorporated by reference as if set forth fully herein.

BACKGROUND OF THE INVENTION

1) Field of the Invention

The field of the present invention generally relates to lighting systems and, more particularly, to lighting systems used in transit vehicles or conveyances such as buses, lightrail cars, and the like.

2) Background

Transit vehicles and similar conveyances typically rely on fluorescent lighting to provide illumination, in part because of the historical efficiency of such lighting as compared to, e.g., incandescent lighting. Fluorescent lighting in transit vehicles generally involves the placement of one or more elongate tube-like fluorescent bulbs in an overhead lighting compartment, with a series of such compartments stretching from front to back and on either side of the transit vehicle.

Recently, LED-based lighting using light-emitting diodes (LED) has been proposed or developed for transit vehicles. An example of an LED-based lighting system for use in transit vehicles is described, for example, in U.S. patent application Ser. No. 11/850,659 filed Sep. 5, 2007, assigned to the assignee of the present invention, and hereby incorporated by reference as if set forth fully herein. Like fluorescent lighting, LED-based lighting fixtures may be placed in overhead lighting compartments stretching from the front to back and on either side of the transit vehicle, for example.

One potential problem with overhead lighting in transit vehicles is glare caused by undesired reflection of the lights off the windshield or mirrors, especially at nighttime, hindering the driver's ability to see traffic or other road hazards and potentially causing driver eyestrain.

It would therefore be advantageous to provide a lighting system for a transit vehicle or conveyance, which overcomes one or more of the disadvantages or limitations of conventional lighting systems and may, for example, mitigate or eliminate internal reflective glare from the windshield or mirrors of the transit vehicle, or provide other benefits and advantages not found in conventional transit vehicle lighting systems.

SUMMARY OF THE INVENTION

The invention is generally directed in one aspect to a novel lighting system that is particularly well suited for a transit vehicle or similar conveyance, but which may find other uses or applications as well.

According to one embodiment as disclosed herein, a low glare overhead lighting fixture for a transit vehicle comprises a lighting fixture base assembly for mounting one or more light sources (e.g., LEDs or fluorescent tubes), and a light permeable cover which is adapted to reduce glare. The light permeable cover may include one or more lens covers and a light guide which may, for example, be embodied as a grid-like structure with holes or perforations for directing the light from the light source in a manner reducing light spread and, consequently, glare that might otherwise be caused by widely diffused light reflecting off interior windows of the vehicle. In certain embodiments, the light guide may be disposed between a front lens cover and a rear lens cover. The light guide may comprise an interlaced honeycomb grid or lattice-like structure having relatively thin interconnecting arm-like members forming hexagonal holes or perforations through which light from the light sources travel.

In other embodiments, a low glare overhead lighting fixture may utilize a light permeable cover having an anti-glare surface element, such as a privacy filter screen or mesh (which may be formed using microlouver technology), positioned on the interior or exterior thereof.

In one embodiment, a low glare overhead lighting fixture includes a lighting fixture base assembly having separate compartments in which one or more LEDs are disposed. The LED compartments may comprise, or be lined with, highly reflective material to increase light output. A light permeable cover outfitted with a light guide and/or anti-glare surface element may be affixed to the lighting fixture base assembly to reduce glare from the LEDs within a transit vehicle, for example.

Further embodiments, variations and enhancements are also disclosed herein.

DETAILED DESCRIPTION OF PREFERRED EMBODIMENT(S)

According to various embodiments as disclosed herein, a low-glare overhead lighting fixture for an LED- or fluorescent-based lighting system for use in a transit vehicle may comprise, for example, one or more of (i) a lighting fixture base assembly for mounting one or more light sources (e.g., LEDs or fluorescent tubes), for illuminating an area of a transit vehicle; and (ii) a light permeable cover which is adapted to reduce glare. The light permeable cover may include one or more lens covers and a light guide which may be embodied as a grid-like structure with holes or perforations for directing the light from the light source in a manner reducing light spread and, consequently, glare that might otherwise be caused by widely diffused light reflecting off interior windows of the vehicle. In other embodiments, the light permeable cover may have an anti-glare surface element, such as a privacy filter screen or mesh (which may be formed using microlouver technology), positioned on the interior or exterior thereof.

Figure 1A:
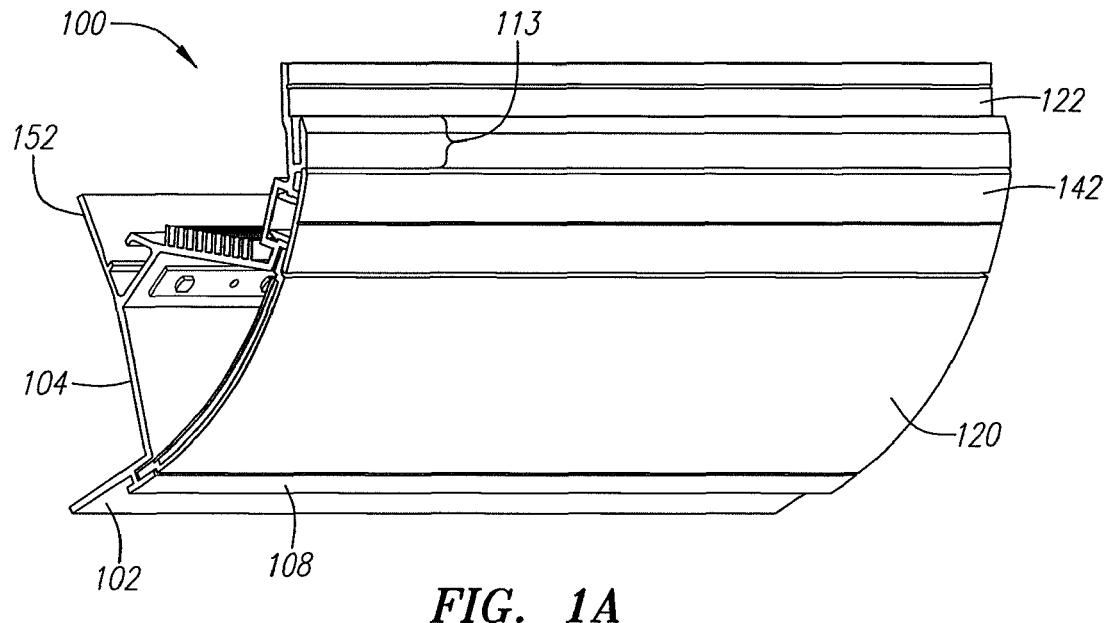
FIGS. 1A and 1B are diagrams illustrating an oblique view of a low glare lighting panel fixture with LEDs for illumination as may be used in a transit vehicle, in accordance with one embodiment as disclosed herein.
Figure 1B:
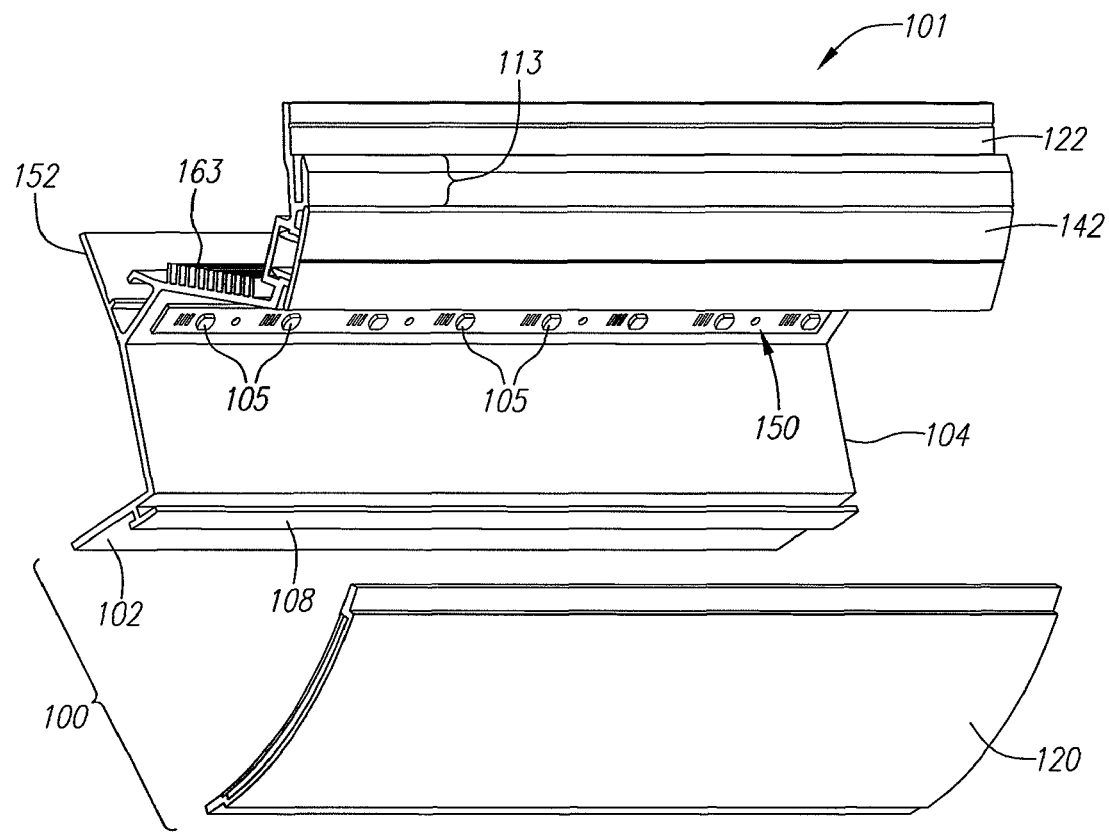

FIGS. 1A and 1B are diagrams illustrating an oblique view of a low glare overhead lighting panel fixture 100 with LEDs 105 for illumination as may be used in a transit vehicle, in accordance with one embodiment as disclosed herein. The lighting panel fixture 100 in this example may include, among other things, a ceiling panel 102, an LED lighting mount 104, and a riser panel support 122, which collectively form a lighting fixture base assembly 101 (see FIG. 1B). The ceiling panel 102 may generally be configured or adapted to be positioned over a seating area in a transit vehicle (or similar conveyance), and may abut the interior sidewall of the transit vehicle or else connect to an adjacent side ceiling panel (not shown). For example, an adjacent side ceiling panel may slide into the groove formed beneath an elongate holding member 108 which, in this example, can be embodied as a T-shaped bar running the length of the lighting panel fixture 100. The riser panel support 122 may also adjoin or support additional panels that extend upwards to the center ceiling area of the transit vehicle or some other top surface, or else may itself extend to such an area or surface. For example, an upward-extending center ceiling panel, which may be generally quarter-arc shaped, and which may or may not be hinged, may slide into the groove formed beneath an elongate holding member 113 which, in this example, may be embodied as a U-shaped bar running the length of the lighting panel fixture 100. The particular shape and dimension of the ceiling panel 102 and riser panel 122 may be varied according to design needs and interface considerations, and are not critical to the operation of the invention. Likewise, other mechanisms for housing and mounting LEDs in a lighting fixture may be utilized, while still making use of the inventive techniques disclosed herein.

The LED lighting mount 104 in this example interconnects the ceiling panel 102 and the riser panel support 122 so as to form an LED assembly. A series of LEDs 105 may be positioned along the LED lighting mount 104 in a linear array or other configuration. The LEDs 105 may be mounted on a metal PCB for convenient modular attachment and/or to help dissipate heat. Although eight LEDs 105 are shown in this particular example, any number of LEDs may be used, and the lengthwise dimension of the lighting fixture 100 may be varied to suit the number of LEDs 105 utilized. In one particular example, the lighting panel fixture 100 and the LED lighting mount 104 are approximately 60" in length, which corresponds to a typical size of a fluorescent lighting unit commonly used in transit vehicles such as buses. The lighting panel fixture 100 may also be a modular component in a larger fixture—each of the lighting panel fixtures 100 for example being one of several LED units that can be assembled lengthwise in a larger contiguous fixture. For example, five of the lighting panel fixtures 100, each 12" long, could be assembled to form a larger (60") fixture. In this example, each LED could have eight LEDs 105, arranged in a linear array, as illustrated in FIG. 1B (with light permeable cover 120 removed).

Further details concerning variations for constructing an LED-based lighting fixture are described in U.S. patent application Ser. No. 11/850,659 filed Sep. 5, 2007, previously incorporated by reference as if set forth fully herein.

A composite removable light permeable cover 120, details of which are explained hereinafter, may be provided or affixed to the LED lighting mount 104, for, among other things, softening or evening out the illumination from the LEDs 105. FIG. 1B, in particular, illustrates the LED-based lighting fixture 100 with the removable light permeable cover 120 detached, leaving the lighting fixture base assembly 101. The light permeable cover 120 is preferably of sufficient opaqueness to make the LEDs 105 appear as a single broad light source (as opposed to discrete or individual point light source), without substantially affecting the amount of illumination output from the lighting unit. A removable snap-in lens holder 142 may be provided, according to this example, to allow rapid removal of the light permeable cover 120. In this particular example, a pair of prong-shaped members on the back of the snap-in lens holder 142 can be manually pressed into an elongate groove running the length of the lighting fixture 100, located at the base of the riser panel support 122 at the junction of the riser panel support 122 and the LED lighting mount 104. The removable snap-in lens holder 142 may be removed simply by using a prybar or otherwise exerting outward pressure on the snap-in lens holder 142. Other means may also be used to secure the removable snap-in lens holder 142, such as, for example, screws or other locking or latching mechanisms. The light permeable cover 120 may be held in place by the combination of the removable snap-in lens holder 142 and the topside groove underneath elongate holding member (i.e., T-shaped bar) 108.

The light permeable cover may be placed in position by sliding a first tab-shaped member 175 (illustrated in FIG. 1C) into the topside groove beneath elongate holding member 108, pressing a second tab-shaped member 174 against the junction of the riser panel support 122 and the LED lighting mount 104, and then inserting the removable snap-in lens holder 142 into position, thereby locking the second tab-shaped member 174 into position.

Figure 1C:
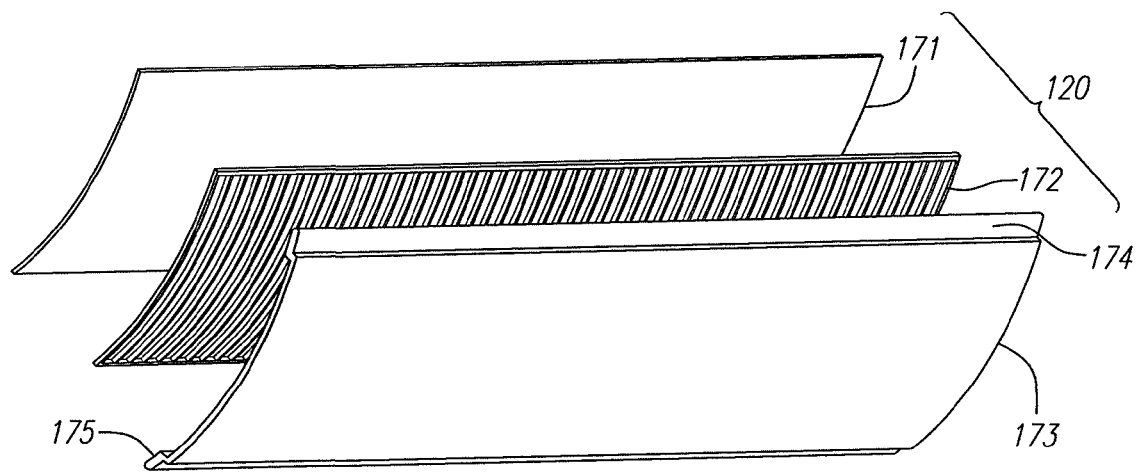
FIG. 1C is a diagram showing details of a composite lens cover for the low glare lighting panel fixture of FIGS. 1A and 1B, in accordance with one embodiment as disclosed herein.
Figure 2:
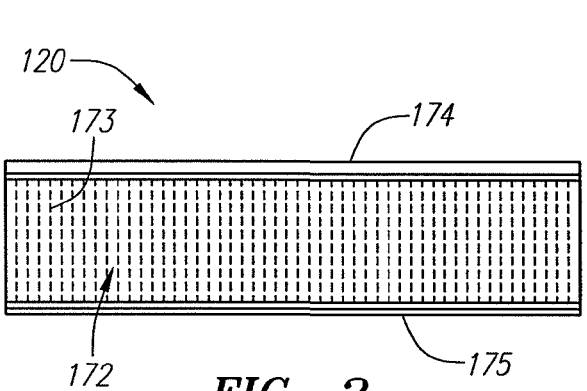
FIG. 2 is a front view diagram of the composite lens cover illustrated in FIG. 1C.
Figure 3:
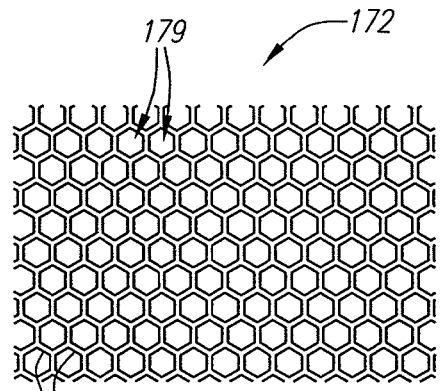
FIG. 3 is a close-up diagram illustrating details of an example of a light grid as may be employed in the composite lens cover of FIG. 1C.

FIG. 1C also shows additional details of the composite removable lens cover 120 for the low glare lighting panel fixture of FIGS. 1A and 1B, in accordance with one embodiment as disclosed herein, which has particular utility for reducing interior window glare within the transit vehicle that might otherwise be produced by the lighting panel fixture 100. In the particular example of FIG. 1C, the composite removable light permeable cover 120 may include a light guide 172 disposed (e.g., sandwiched) between a front lens cover 173 and a rear lens cover 171, appearing when assembled as in FIG. 2 for example, from the front. The light guide 172 may be embodied, for example, as a grid-like structure with numerous small holes or perforations for directing the light from the LEDs 105 in a manner reducing light spread and, consequently, glare that might otherwise be caused by widely diffused light reflecting off interior windows of the vehicle. In the example of FIG. 3, the light guide 172 comprises an opaque sheet with an interlaced honeycomb grid or lattice-like structure having relatively thin interconnecting arm-like members 180 forming, in this case, hexagonal holes or perforations 179 through which light from the LEDs 105 travels.

The light guide 172 is preferably bendable or flexible so that it can be readily shaped to follow the contours of the front lens cover 173. The light guide 172 may be comprised of a lightweight metal such as aluminum (or an aluminum alloy), or else could be made of carbon fiber, plastic, cardboard, rubber, or other such materials. A reflective material such as aluminum may minimize light loss resulting from the placement of the light guide 172 in front of the LEDs 105. The thickness of the light guide 172 preferably ranges from 1/8" to 1/4" but could also be thinner or thicker depending upon the particular application. The width of the perforations or holes 179 may be, for example, approximately 1/8" but again different sizes may be used depending upon the particular application. In general, the optimal size is one which satisfactorily channels light from the LEDs 105 in a manner reducing interior glare to an acceptable level, while minimizing the loss of light from the LEDs 105 as well as shadowing or other noticeable effects. To minimize light loss, the interconnecting arm-like members 179 are preferably constructed as thin as possible while maintaining structural integrity. Aluminumized honeycomb lattices in various sizes are made for aerospace applications and may be advantageously employed in the current setting for the described purposes.

The holes or perforations 179 of the light guide 172 may take any of a variety of shapes, for example, besides being hexagonal they may alternatively be octagonal, circular, pentagonal, or some other appropriate shape. The light guide 172 may be moved closer to the LEDs 505, but then the light may have more ability to diffuse before reaching the light permable cover 120. Therefore, it is considered more advantageous to position the light guide 172 at a similar location to the light permeable cover 120 to prevent diffusion and light loss.

The light guide 172 may be held in place in a variety of manners; for example, it may be attached to the front lens cover 173 or rear lens cover 171 with an adhesive, or else it may be physically held in place by bonding wire or by locking it between the tabs 174, 175 of the front lens cover 173 when the overall composite light permeable cover 120 is secured into the lighting fixture base assembly 101. The front lens cover 173 and rear lens cover 171 may be either clear or diffuse (or one may be clear and the other diffuse), and may be formed, e.g., by plastic/injection molding or some other suitable means.

In one embodiment of lighting panel fixture 100 using the composite light permeable cover 120 with light guide 172, the LEDs 105 are relatively deeply set (as compared to, for example, a fluorescent lighting fixture with a central fluorescent tube running down the length of the fixture); this arrangement permits the light from the LEDs 105 to be more uniform in direction by the time the light reaches the composite light permeable cover 120 and, hence, reduces spillage of light to the sides of the lighting panel fixture 100. The light guide 172 is thereby able to effectively orient and constrain the light emanating from the LEDs 105 to become more parallelized and less diffuse. By reducing light spillage, undesired glare on the interior windshield (or other windows) of the transit vehicle is reduced. This result is accomplished in a relatively inexpensive and simple way with materials that are generally readily available.

In one embodiment, the LED lighting mount 104 is constructed using aluminum extrusion, and operates as a heat sink in addition to providing physical support for the LEDs. To further facilitate heat dissipation, the LED lighting mount 104 may be configured with metallic heat dissipating fins 163 on the backside of one or more of its walls. Such heat dissipating fins 163 may be particularly advantageous where high power LEDs are utilized (which may have operating current from 200 mA to 700 mA or more). The riser panel support 122 may be constructed of a lightweight durable material such as fiberglass, or PVC plastic. Ceiling panel 102 is preferably formed of a composite material, such as two metal layers sandwiching an insulator material. For example, the composite material may be DIBOND™, a lightweight yet rigid aluminum composite material consisting of a polyethylene core and aluminum cover sheets with a thickness of approximately 0.3 millimeters, coil-coated on front and reverse sides according to ECCA-Standards with a protective film. DIBOND material is commercially available from Alcan Inc. of Montreal, Canada, and is commonly used on transit vehicles. This type of composite material helps prevent condensation when air conditioning is employed.

Figure 4:
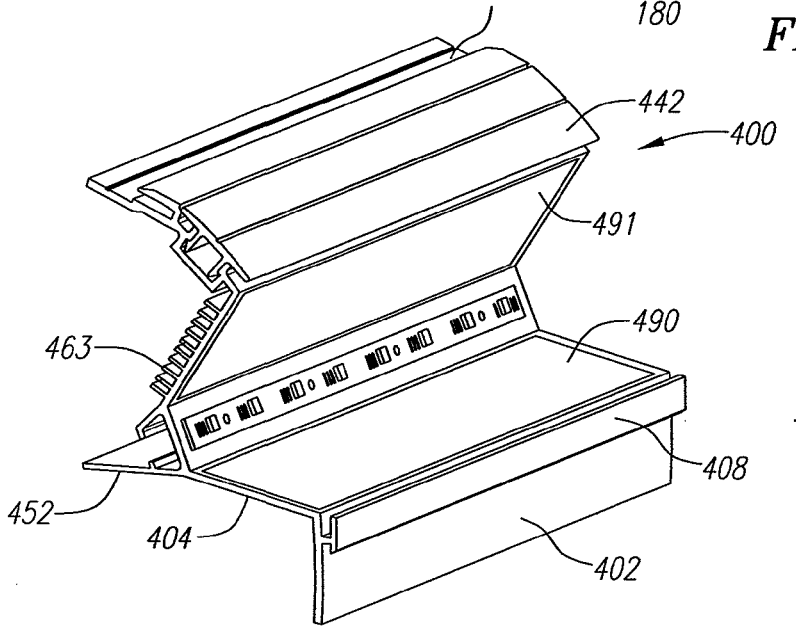
FIG. 4 is a diagram of a low glare lighting panel fixture similar to FIGS. 1A and 1B, having a reflective metallic interior coating for increasing light output.

A variation of the lighting panel fixture of FIGS. 1A-1C is illustrated in FIG. 4, which is a diagram of a low glare lighting panel fixture 400 similar to FIGS. 1A and 1B, and also having a highly reflective metallic interior coating for increasing light output. In particular, a highly reflective metallic interior coating material is applied to the interior surfaces 490, 491 of LED mount 404, whereby light output from the LEDs 405 is reflected and thus enhanced. By contrast, many transit vehicle light fixtures, such as conventional fluorescent light fixtures, have plain white sidewalls which, while somewhat reflective, do not provide the same benefits as the highly reflective metallic interior coating of the lighting panel fixture 400 of FIG. 4. The metallic interior coating material may be, for example, aluminum (or aluminum foil tape), an aluminum alloy, mylar, a silver alloy, or the like. The other labeled features of the lighting panel fixture 400 of FIG. 4 are similar to the like-numbered features of FIGS. 1A-1C (i.e., elements "4xx" in FIG. 4 are similar in nature to elements "1xx" in FIGS. 1A-1C); thus, in FIG. 4 are also depicted a ceiling panel 402, a riser panel support 422, a removable snap-in lens holder 442, and a heat sink 463, all having similar functionality to the lighting panel fixture 100 described with respect to FIGS. 1A-1C.

Figure 5A:
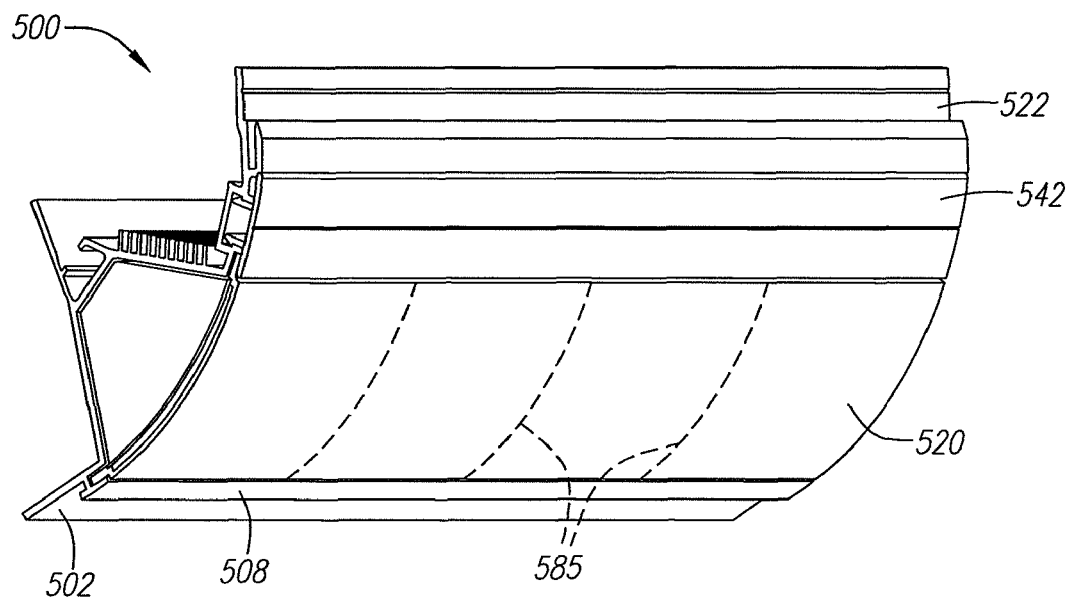
FIGS. 5A through 5C are diagrams illustrating a low glare lighting panel fixture with separate light compartments, as may be used in a transit vehicle, in accordance with another embodiment as disclosed herein.
Figure 5B:
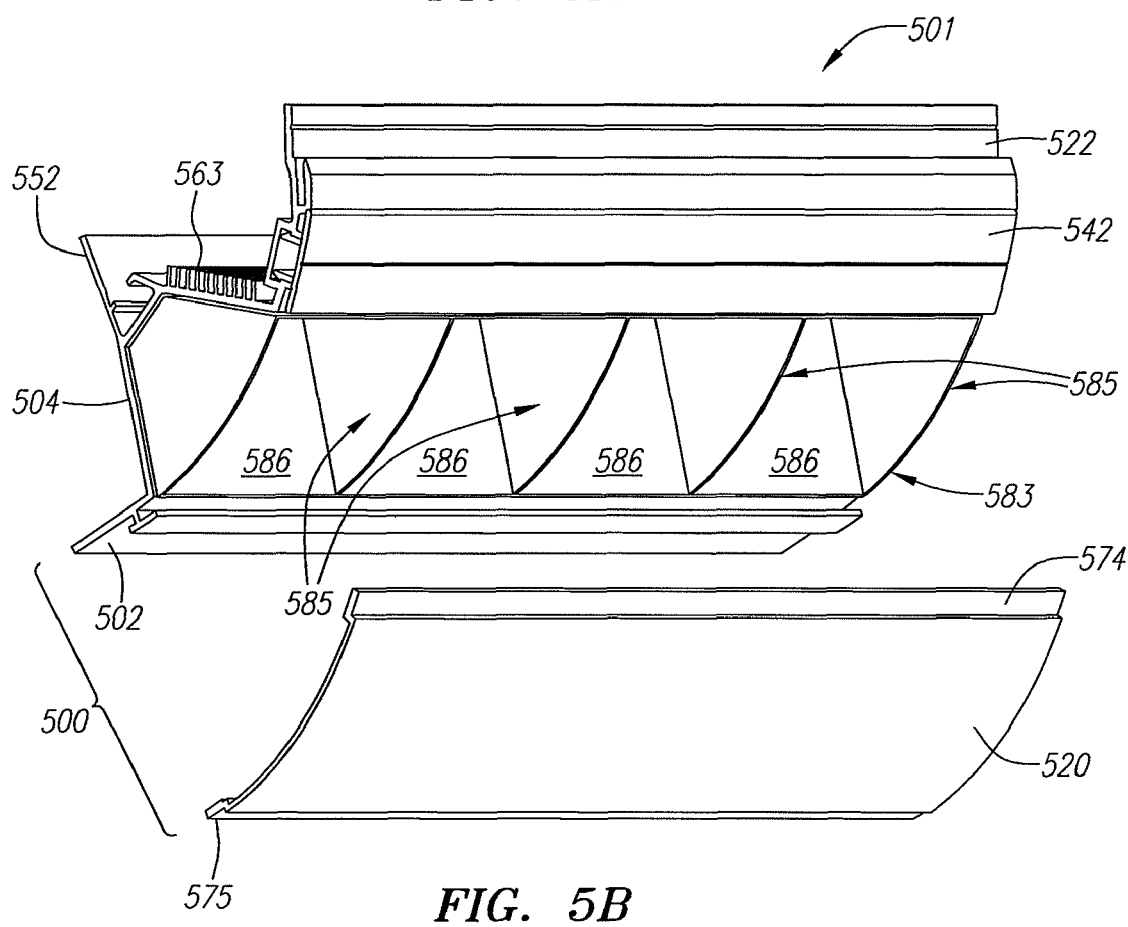
Figure 5C:
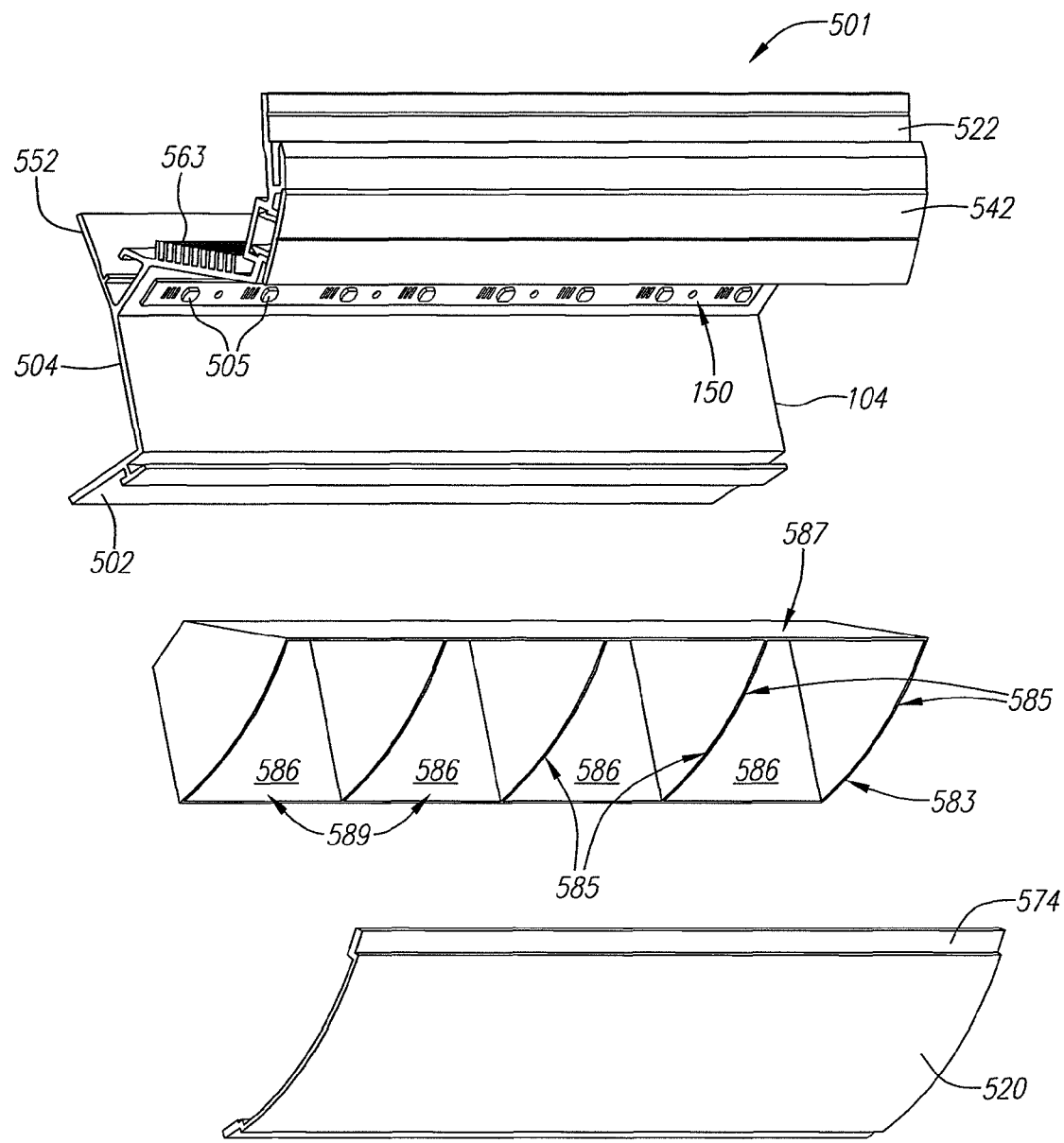

Another variation of a lighting panel fixture for a transit vehicle in accordance with various embodiments as disclosed herein is illustrated in FIGS. 5A through 5C, which depict an example of a low glare lighting panel fixture 500 with separate light compartments. Generally, the various features of the multi-compartment lighting panel fixture 500 of FIGS. 5A-5C are similar to the like-numbered features of FIGS. 1A-1C, and have similar functionality (i.e., elements "5xx" in FIGS. 5A-5C are similar in nature to elements "1xx" in FIGS. 1A-1C); thus, in FIGS. 5A-5C are depicted an LED lighting mount 504 with LEDs 505, a ceiling panel 502, a riser panel support 522, a removable snap-in lens holder 542, and a heat sink 563, all having similar functionality to the lighting panel fixture 100 described with respect to FIGS. 1A-1C. In this embodiment, the LEDs 505 are separated (individually or groupwise) into multiple compartments 586 through the use of a series of compartment walls 585. In this particular example, there are eight LEDs 505 separated into four compartments 586, which may be generally wedge-shaped, with two LEDs 505 in each compartment 586, although different arrangements can also be used (for example, one LED per compartment, or different numbers of LEDs in different compartments).

In this example, as best illustrated in the assembly view in FIG. 5C, the compartments 586 separating the LEDs 505 may be formed by a multi-compartment light guidebox 583, which can be created a single unit for ease of installation. The separate compartments 586 of the multi-compartment light guidebox 583 reduce the spread of the LED emitted from the LEDs 505 and, particularly when lined or coated on the interior walls with reflective material (such as aluminum, aluminum foil tape, an aluminum alloy, mylar, a silver alloy, or the like), increase the amount of forward-directed light on the light permeable cover 520. This arrangement can also be used to decrease the amount of wattage needed for the LEDs 505, thus potentially saving cost or energy requirements. The light permeable cover 520 may be constructed according to any of the techniques previously described with respect to the same element of FIGS. 1A-1C or elsewhere herein. In a preferred embodiment, the light permeable cover 520 is a composite of several different components including a light guide 172 as previously described with respect to FIG. 1C.

It may be noted that the unique multi-compartment light enhancement technique illustrated in FIGS. 5A-5C is generally not possible with fluorescent lamps, because of the elongate nature of such lamps, requiring them to span the entire width of the whole light compartment.

Figure 6A:
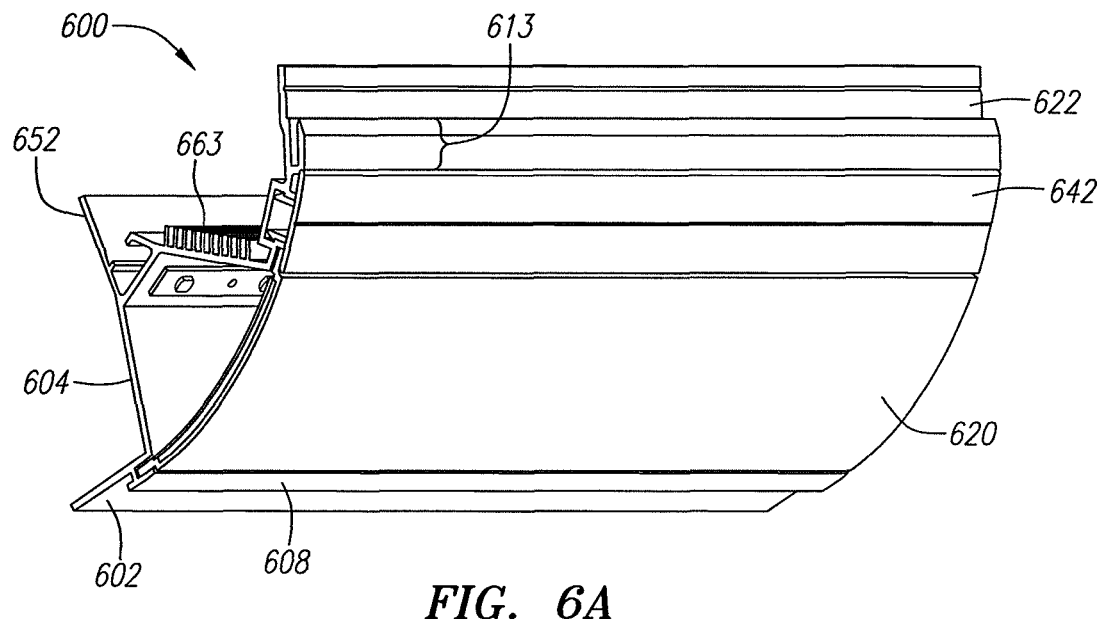
FIGS. 6A through 6C are diagrams illustrating a low glare lighting panel fixture with LEDs for illumination and an anti-glare surface element as may be used in a transit vehicle, in accordance with another embodiment as disclosed herein.
Figure 6B:
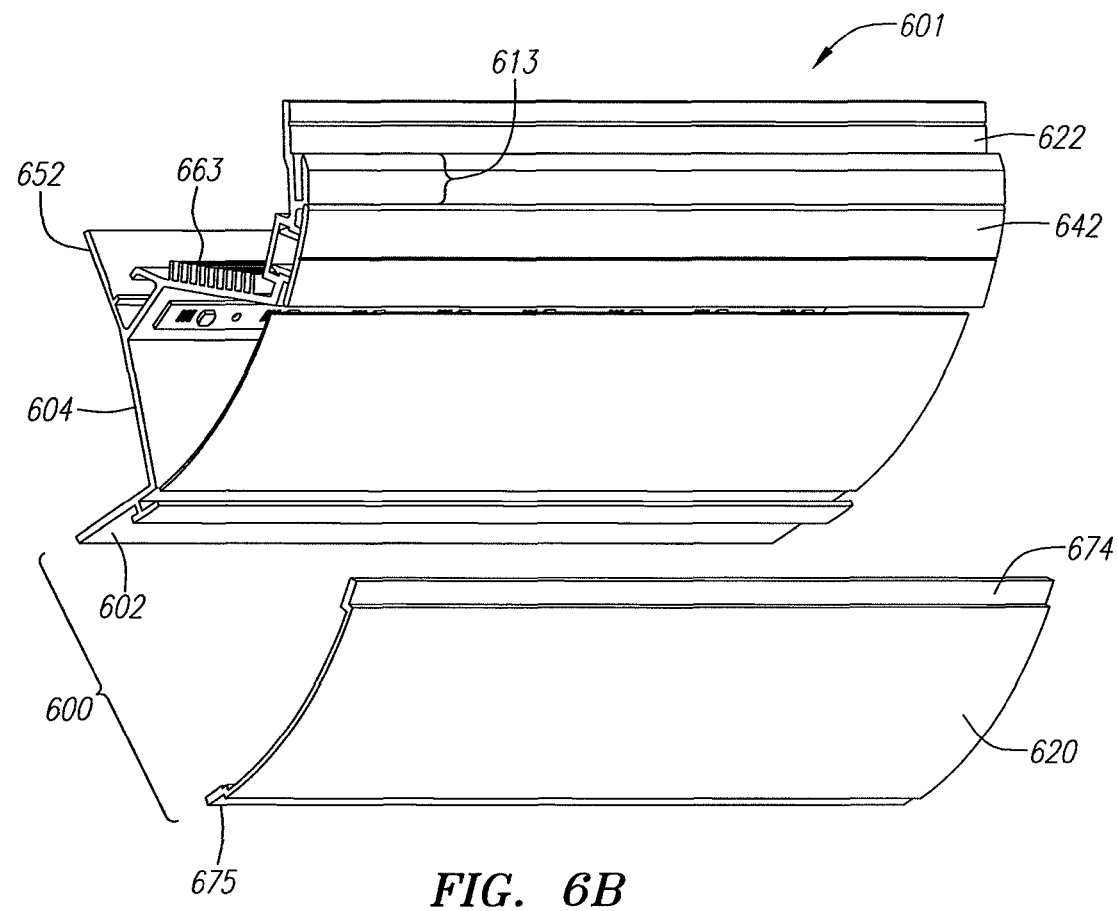
Figure 6C:
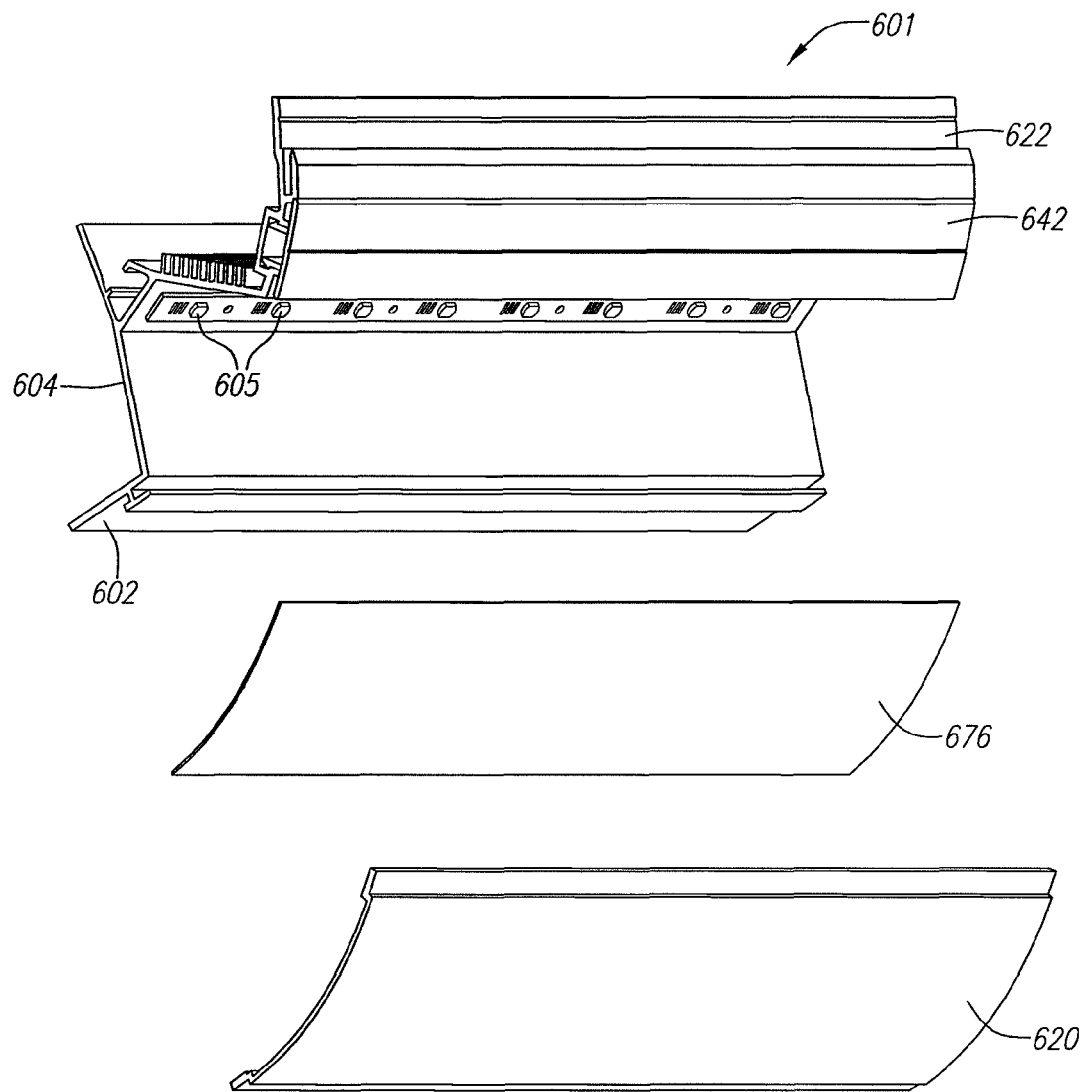

Another embodiment of a low glare lighting panel fixture 600 with LEDs for illumination, as may be used for example in a transit vehicle, is illustrated in FIGS. 6A-6C. In this embodiment, the various features of the lighting panel fixture 600 of FIGS. 6A-6C are generally similar to the like-numbered features of FIGS. 1A-1C previously described herein, and have similar functionality (i.e., elements "6xx" in FIGS. 6A-6C are similar in nature to elements "1xx" in FIGS. 1A-1C); thus, for example, in FIGS. 6A-6C are depicted an LED lighting mount 604 with LEDs 605, ceiling panel 602, a riser panel support 622, a removable snap-in lens holder 642, and a heat sink 663, all having similar functionality to the lighting panel fixture 100 described with respect to FIGS. 1A-1C.

In this embodiment, as best shown in the assembly view in FIG. 6C, an anti-glare surface element 676 is positioned along the interior surface of light permeable cover 620. FIG. 6A shows the light permeable lens cover 620 with the anti-glare surface element 676 in position behind it. The anti-glare surface element 676 may comprise, for example, a privacy filter screen or mesh (which may be formed using microlouver technology), similar to the type commonly used to provide privacy for computer screens whereby it is more difficult to see the computer screen off-angle (although in this case, the privacy filter screen is being used to control light being used for illumination rather than viewability of an image on a screen). A privacy filter screen may reduce the light spread to approximately in the range of 80 degrees, as opposed to roughly 120 degrees, thus reducing the ability of the LED lights 605 to create glare on the interior windshield of the transit vehicle. An example of one possible privacy filter screen that may be suitable for the purposes herein is manufactured by 3M Corporation under the trade name VIKUITI™. While the privacy filter screen may reduce light glare, it may also have more light loss than the lens grid described earlier herein.

Figure 7A:
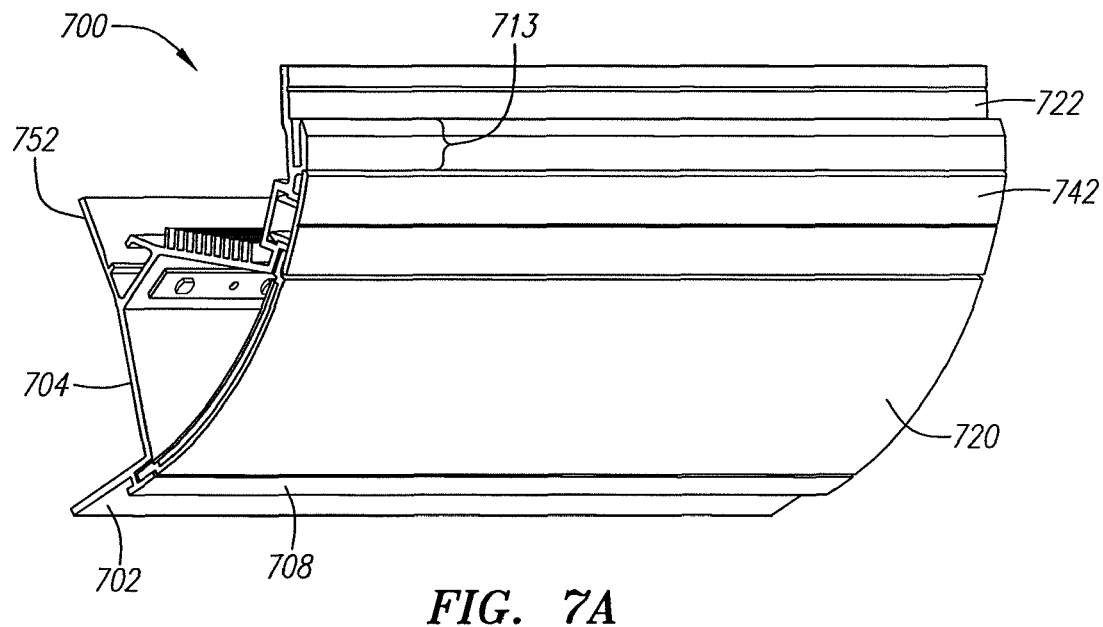
FIGS. 7A through 7C are diagrams illustrating another embodiment of a low glare lighting panel fixture with LEDs for illumination and an anti-glare surface element, similar to FIGS. 6A through 6C.
Figure 7B:
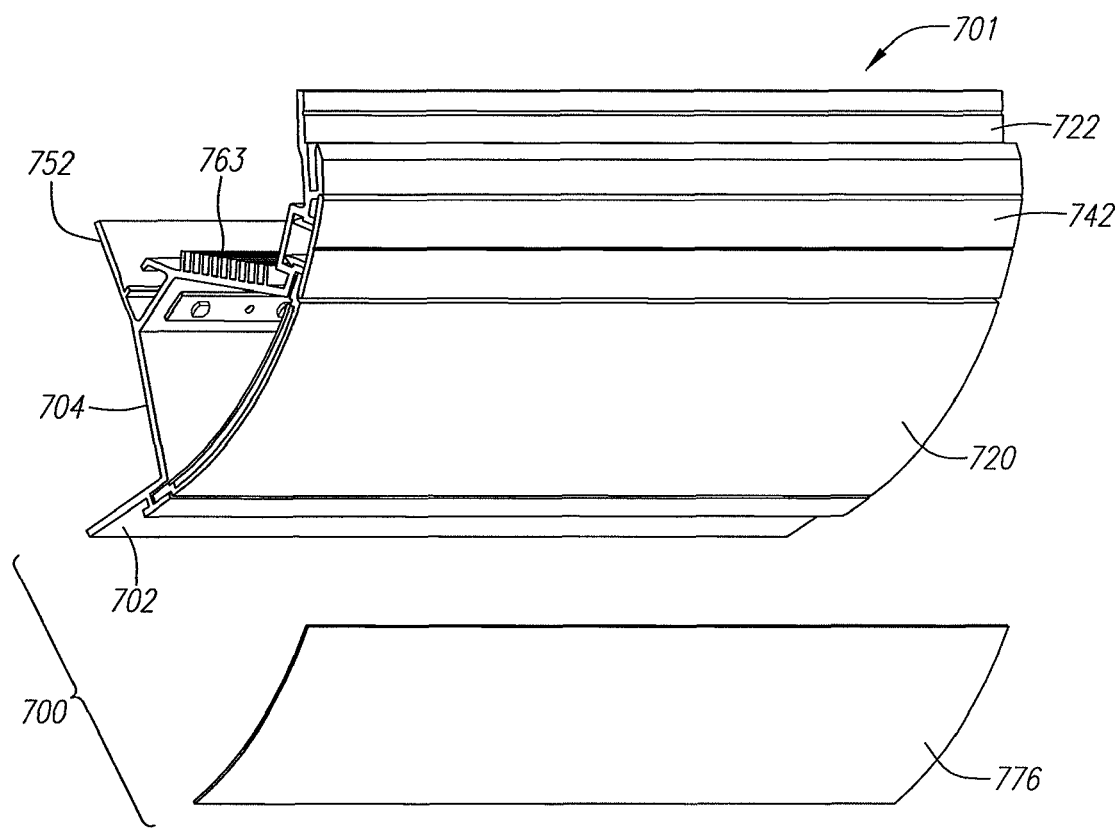
Figure 7C:
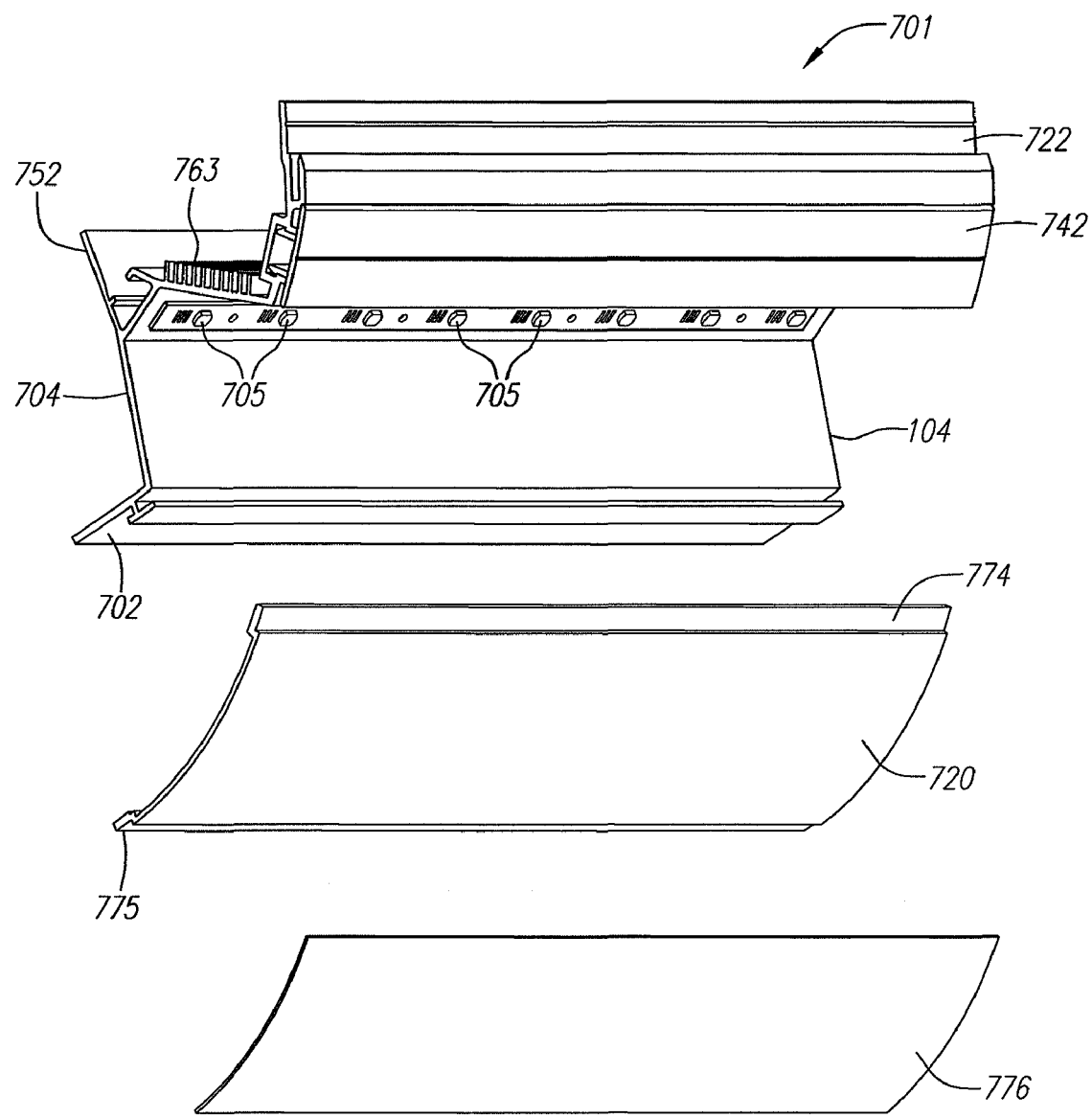

FIGS. 7A through 7C are diagrams illustrating another embodiment of a low glare lighting panel fixture 700 with LEDs for illumination and an anti-glare surface element, similar to the concept of low glare lighting panel fixture 600 in FIGS. 6A-6C. In this embodiment, the various features of the lighting panel fixture 700 of FIGS. 7A-7C are generally similar to the like-numbered features of FIGS. 1A-1C previously described herein, and have similar functionality (i.e., elements "7xx" in FIGS. 7A-7C are similar in nature to elements "1xx" in FIGS. 1A-1C); thus, for example, in FIGS. 7A-7C are depicted an LED lighting mount 704 with LEDs 705, ceiling panel 702, a riser panel support 722, a removable snap-in lens holder 742, and a heat sink 763, all having similar functionality to the lighting panel fixture 100 described with respect to FIGS. 1A-1C.

In this embodiment, as best illustrated in the assembly diagram of FIG. 7C, an anti-glare surface element 776 is positioned proximate to the exterior surface of light permeable cover 720, rather than proximate the interior surface as with FIGS. 6A-6C, although it serves a similar purpose. FIG. 7A shows the light permeable lens cover 720 with the anti-glare surface element 776 disposed in front of it. As before, the anti-glare surface element 776 may comprise, for example, a privacy filter screen, similar to the type commonly used to provide privacy for computer screens, or any other suitable filter element. The anti-glare surface element 776 may, for example, be physically attached to the light permeable cover 720 with an industrial adhesive or by other means (e.g., synthetic threading, small clips, or other means).

Figure 8A:
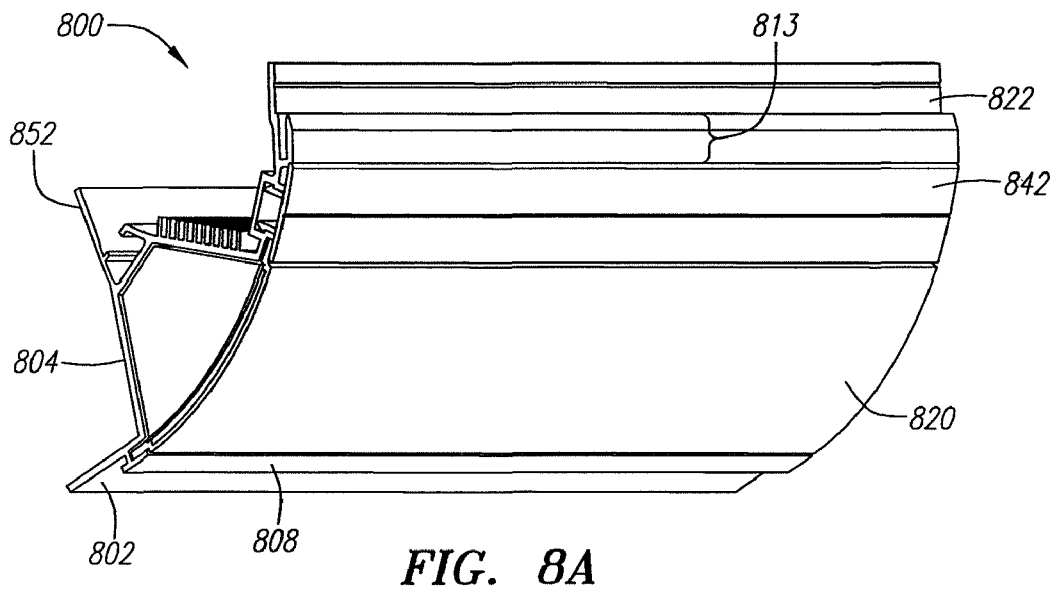
FIGS. 8A through 8C are diagrams illustrating a low glare lighting panel fixture with separate light compartments similar to FIGS. 5A through 5C, as may be used in a transit vehicle, but with an anti-glare surface similar to FIGS. 6A through 6C.
Figure 8B:
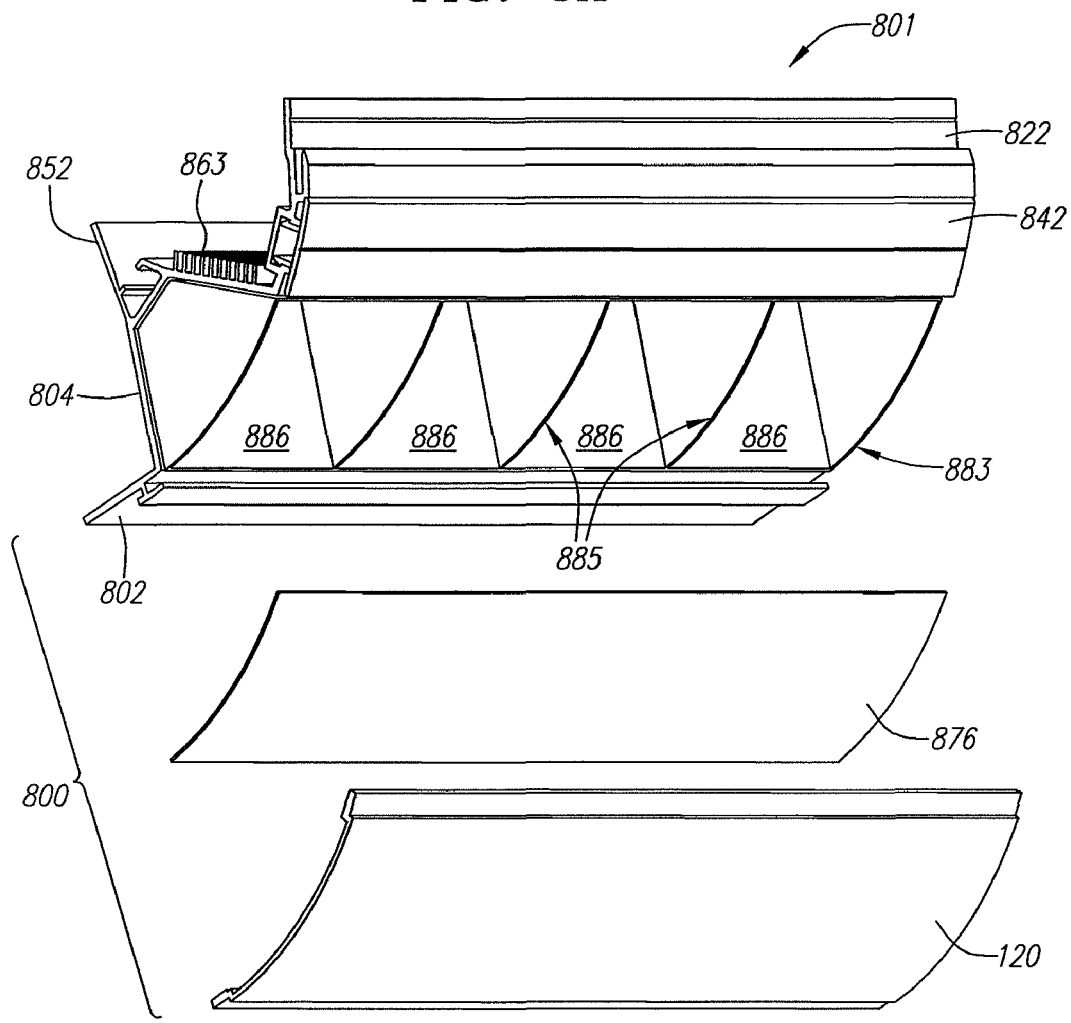
Figure 8C:
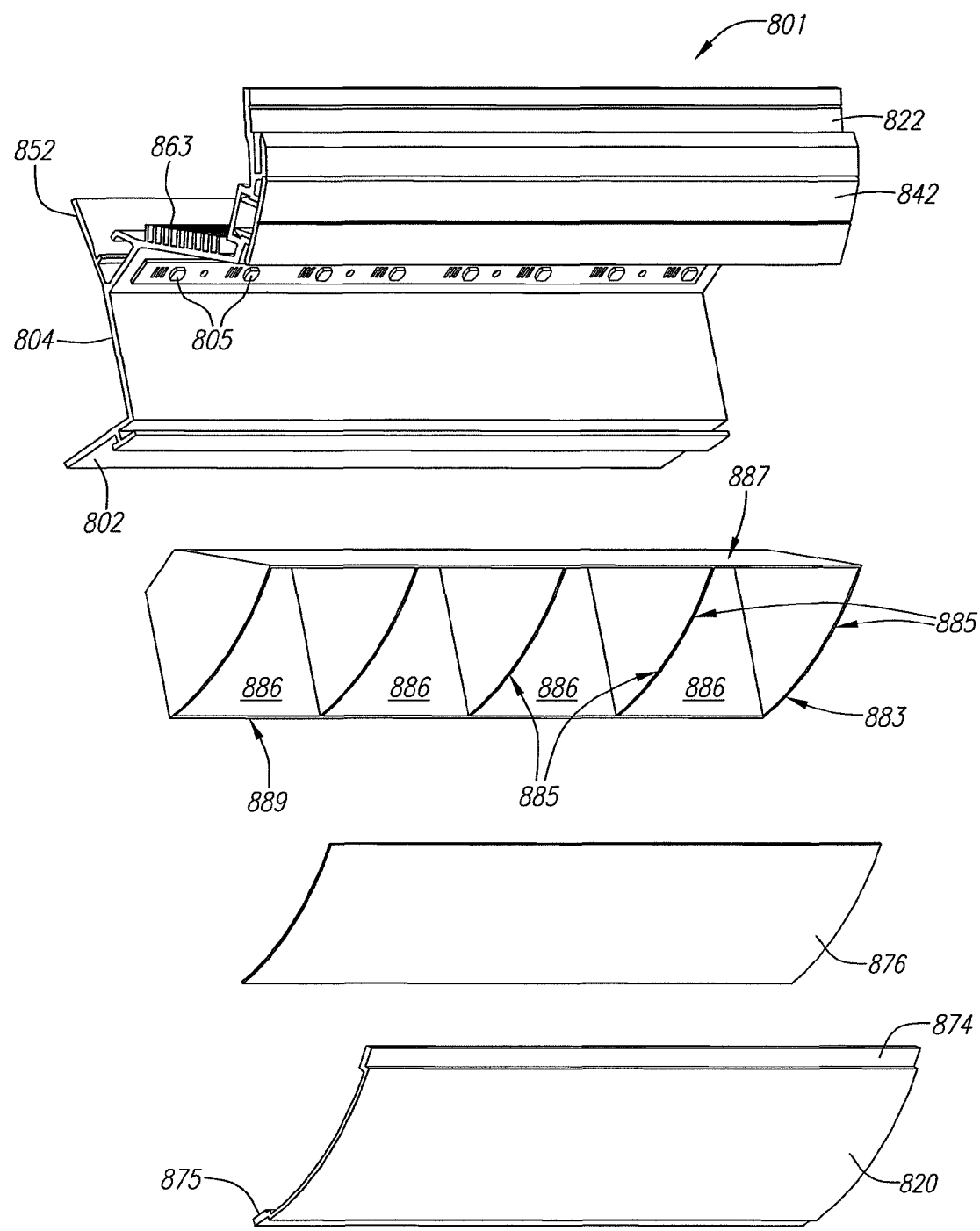

The techniques described herein are not necessarily mutually exclusive, and may if desired may be combined. For example, FIGS. 8A through 8C are diagrams illustrating a low glare lighting panel fixture 800 with separate light compartments 856 similar to the embodiment of FIGS. 5A-5C, but with an anti-glare surface element 876 similar to that utilized in the embodiment of FIGS. 6A-6C. In other regards, the embodiment of FIGS. 8A-8C is similar to the previous embodiments; thus, for example, the various features of the lighting panel fixture 800 of FIGS. 8A-8C are generally similar to the like-numbered features of FIGS. 1A-1C previously described herein, and have similar functionality (i.e., elements "8xx" in FIGS. 8A-8C are similar in nature to elements "1xx" in FIGS. 1A-1C).

Figure 9A:
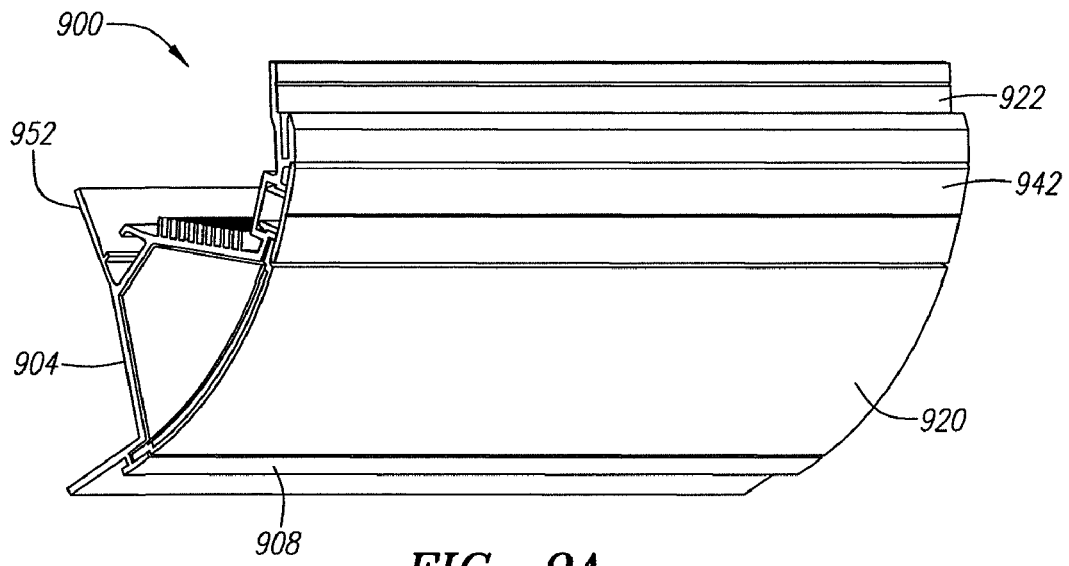
FIGS. 9A through 9C are diagrams illustrating a low glare lighting panel fixture with separate light compartments similar to FIGS. 5A through 5C, as may be used in a transit vehicle, but with an anti-glare surface similar to FIGS. 7A through 7C.
Figure 9B:
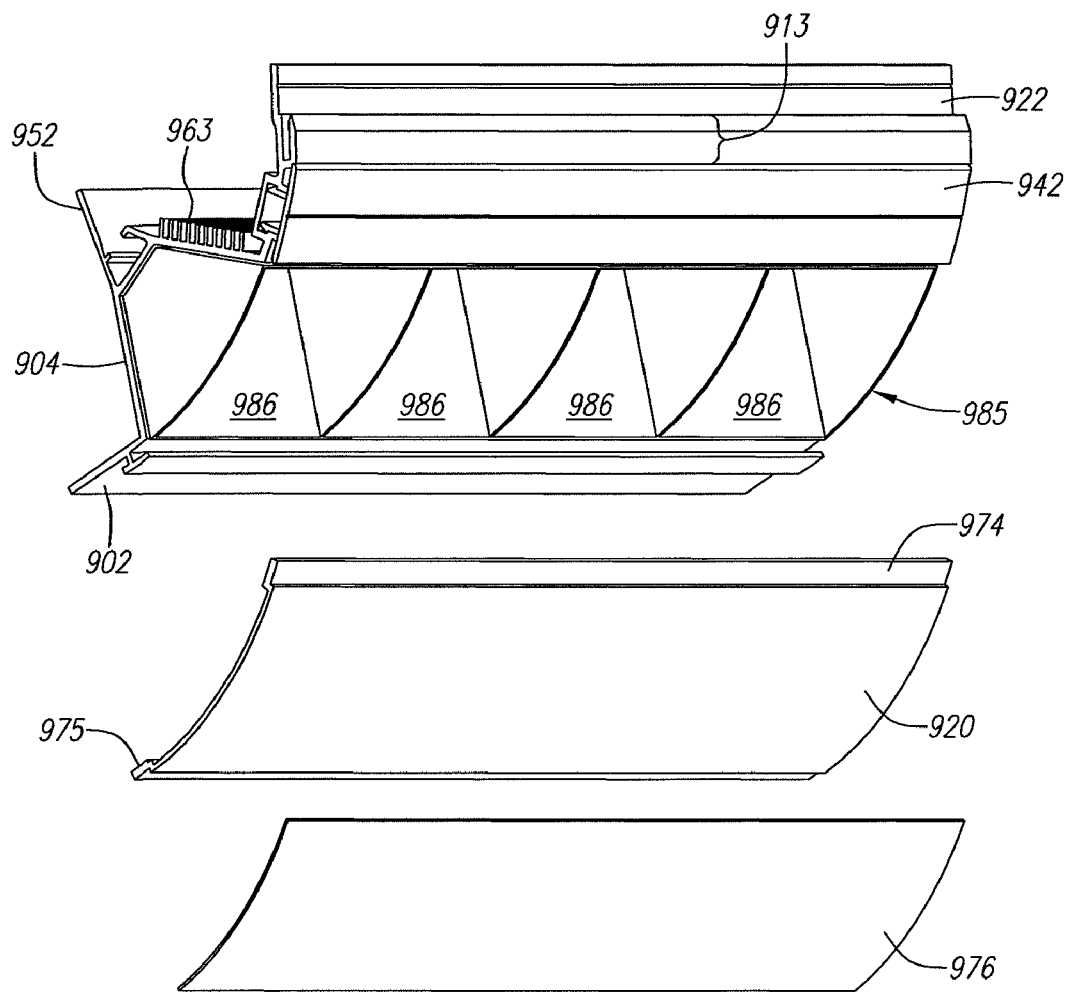
Figure 9C:
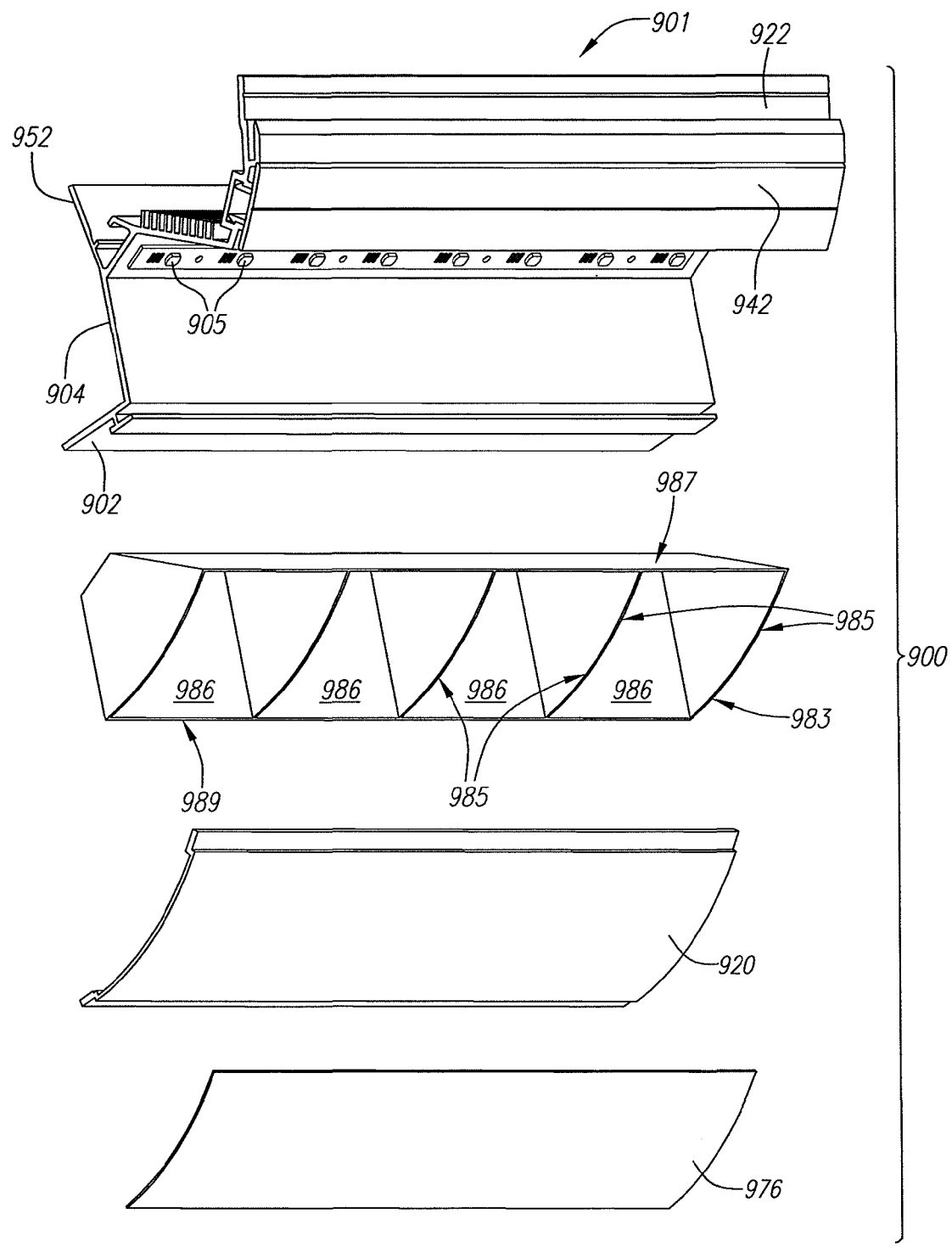

Similarly, FIGS. 9A through 9C illustrate a low glare lighting panel fixture 900 with separate light compartments 956 similar to the embodiment of FIGS. 5A-5C, but with an anti-glare surface element 976 disposed in a manner similar to the embodiment of FIGS. 7A-7C, that is, proximate to the exterior of the light permeable lens cover 920. In other regards, the embodiment of FIGS. 8A-8C is similar to the previous embodiments; thus, for example, various features of the lighting panel fixture 900 of FIGS. 9A-9C are generally similar to the like-numbered features of FIGS. 1A-1C previously described herein, and have similar functionality (i.e., elements "9xx" in FIGS. 9A-9C are similar in nature to elements "1xx" in FIGS. 1A-1C).

Figure 10A:
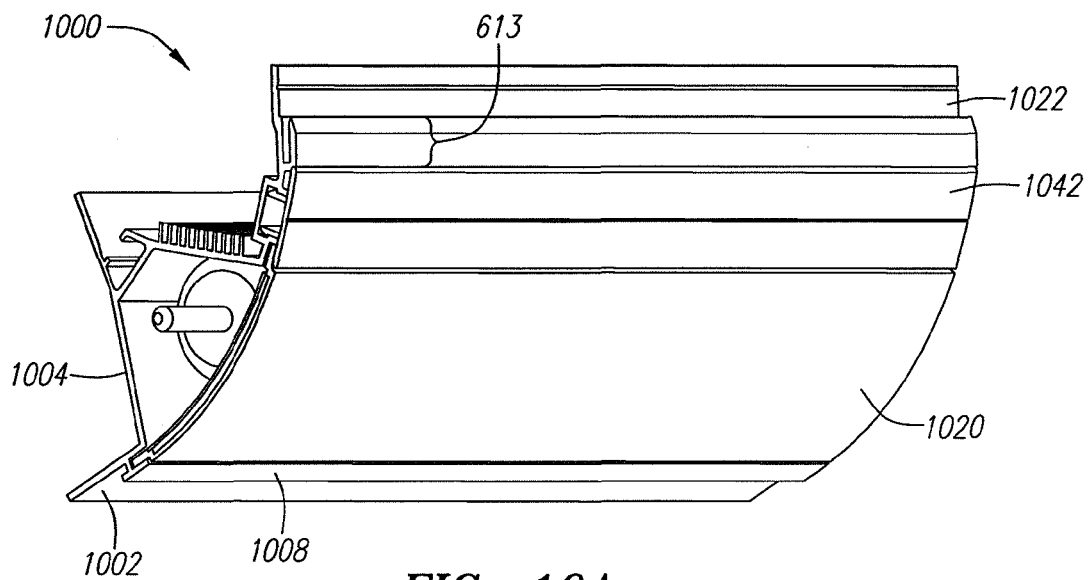
FIGS. 10A through 10C are diagrams illustrating a low glare lighting panel fixture with a fluorescent light tube for illumination and an anti-glare surface element as may be used in a transit vehicle, in accordance with another embodiment as disclosed herein.
Figure 10B:
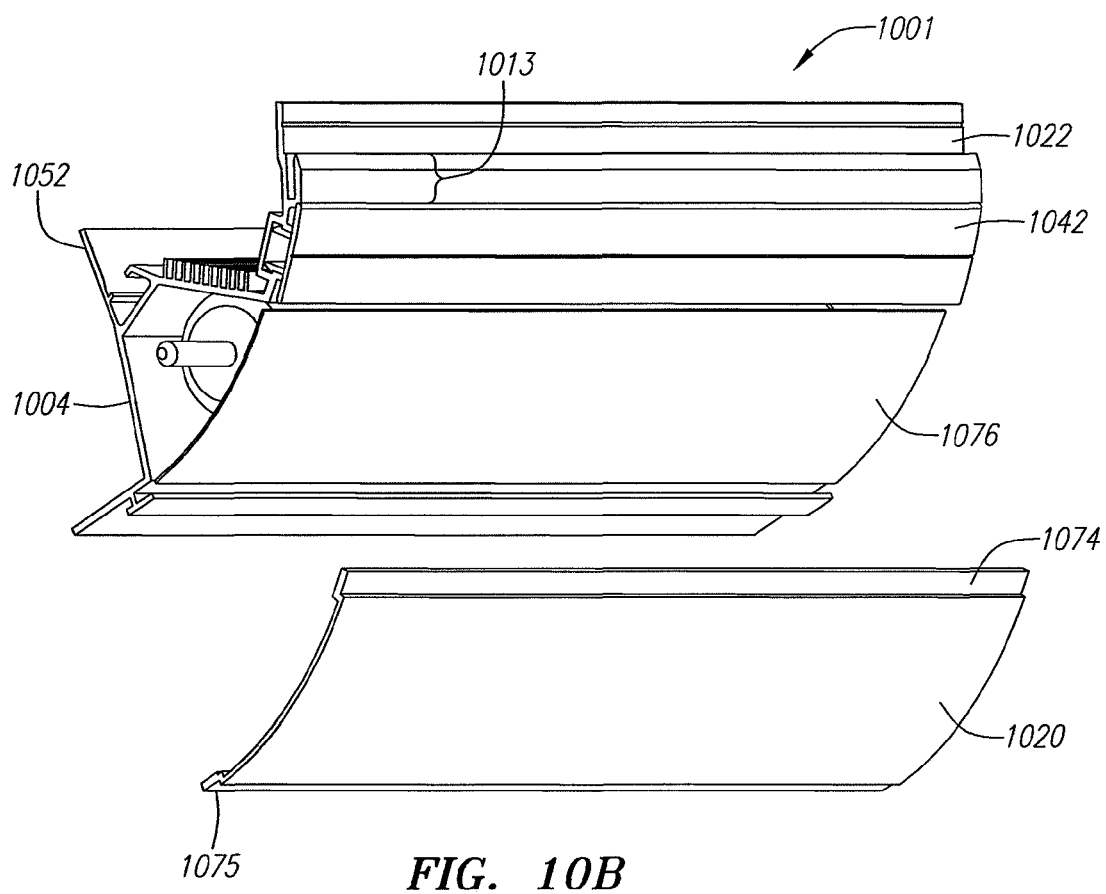
Figure 10C:
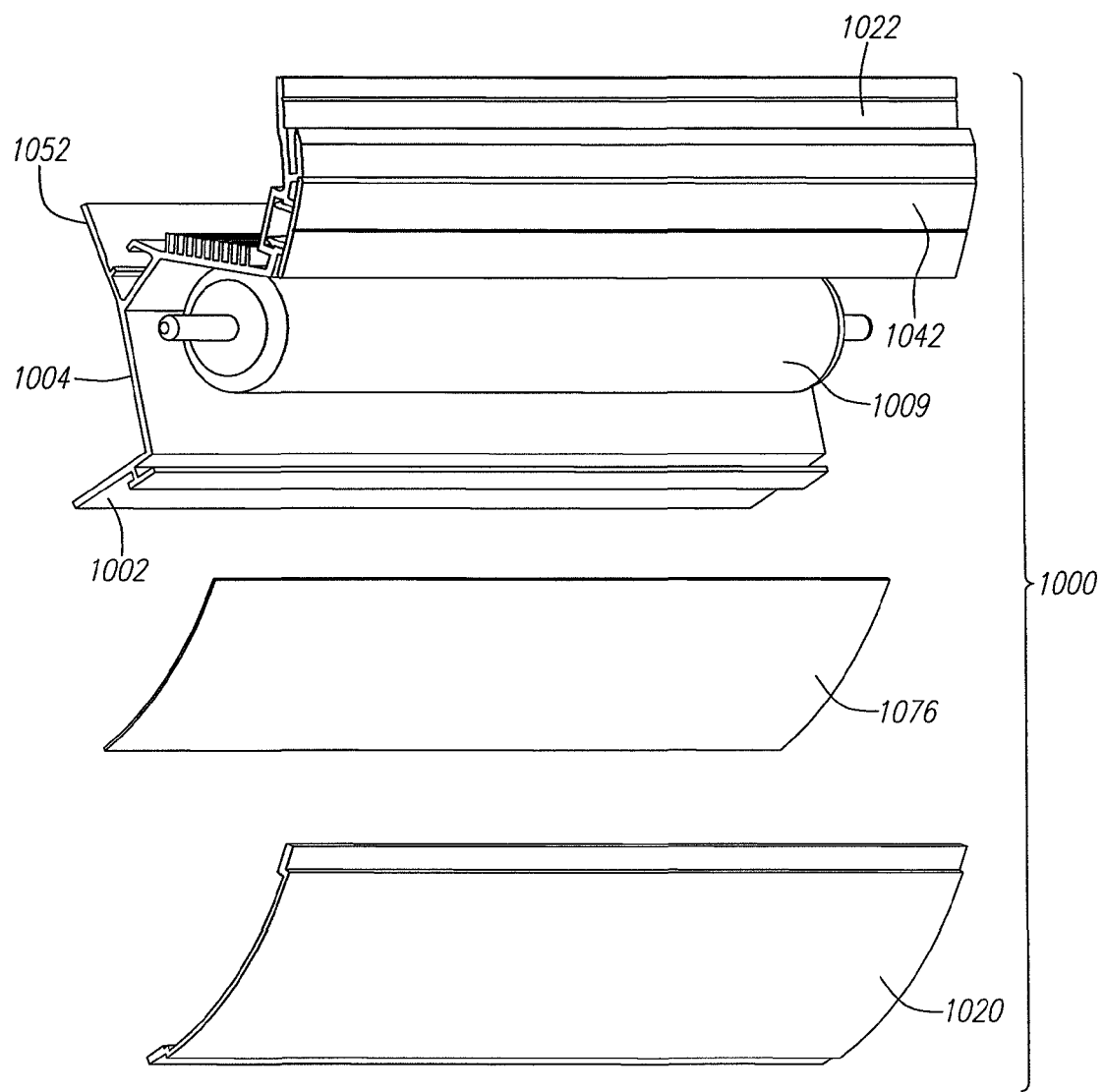

The techniques described above or elsewhere herein may also be adapted for use with fluorescent lighting fixtures. Thus, for example, FIGS. 10A through 10C are diagrams illustrating a low glare lighting panel fixture 1000 with a fluorescent lamp tube 1009 for illumination as may be used in a transit vehicle, in accordance with another embodiment as disclosed herein. Again, the various features of the fluorescent lighting panel fixture 1000 of FIGS. 10A-10C are generally similar to the like-numbered features of FIGS. 1A-1C previously described herein, and have similar functionality (i.e., elements "10xx" in FIGS. 10A-10C are similar in nature to elements "1xx" in FIGS. 1A-1C). Thus, for example, in FIGS. 10A-10C are depicted a ceiling panel 1002, a riser panel support 1022, and a removable snap-in lens holder

1042, all having similar functionality to the lighting panel fixture 100 described with respect to FIGS. 1A-1C. The fluorescent lighting fixture 1000 further includes a fluorescent lighting mount 1004 for containing the fluorescent lamp tube 1009, which is secured at either end to lamp holding elements (not shown) as is commonly practiced in the transit vehicle industry. The fluorescent lighting fixture 1000 further includes an anti-glare surface element 1076 disposed proximate to the interior surface of a light permeable cover 1020, in a similar manner as described with respect to the embodiment of FIGS. 6A-6C, in order to reduce light glare within the interior of the transit vehicle.

Figure 11A:
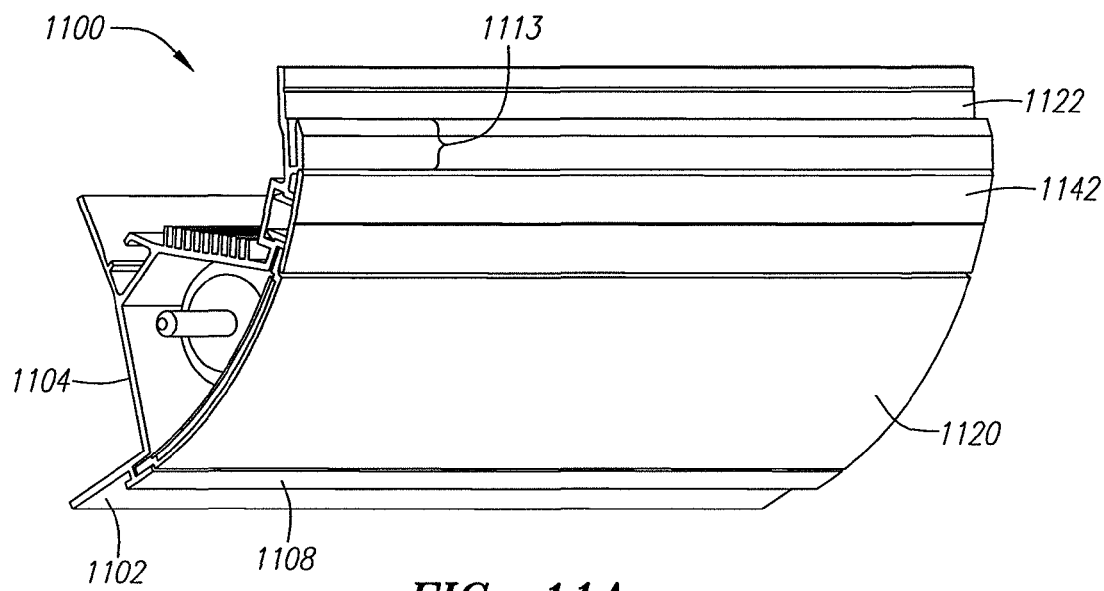
FIGS. 11A through 11C are diagrams illustrating another embodiment of a low glare lighting panel fixture with a fluorescent light tube for illumination and an anti-glare surface element as may be used in a transit vehicle.
Figure 11B:
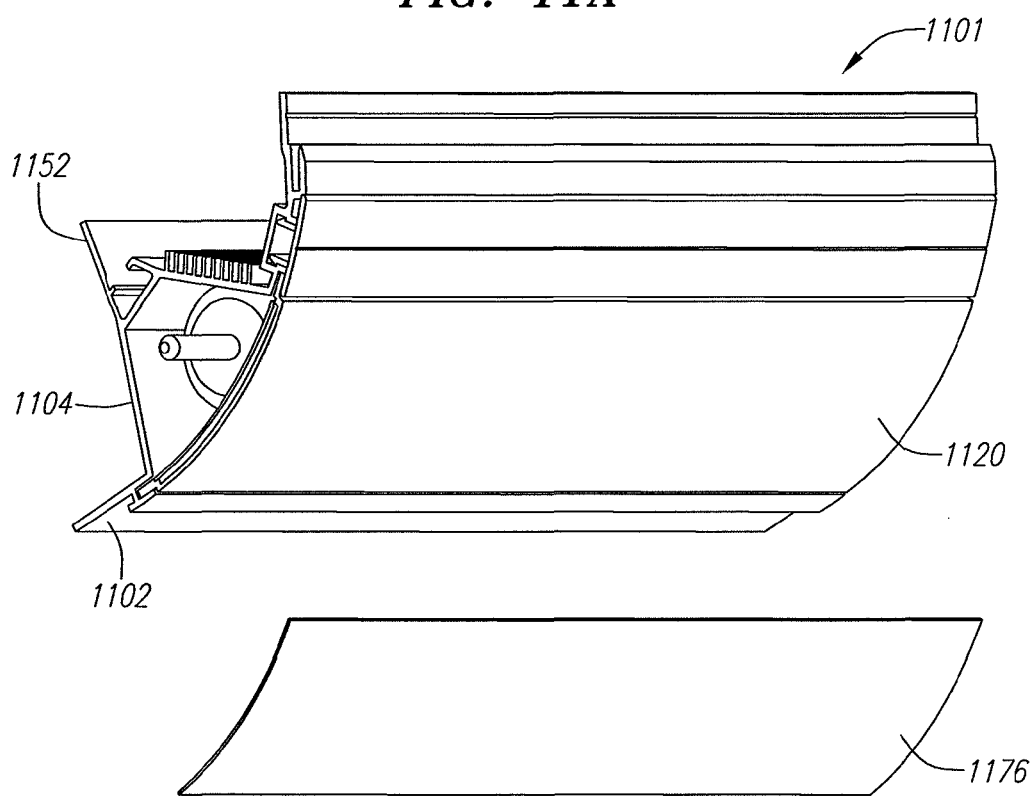
Figure 11C:
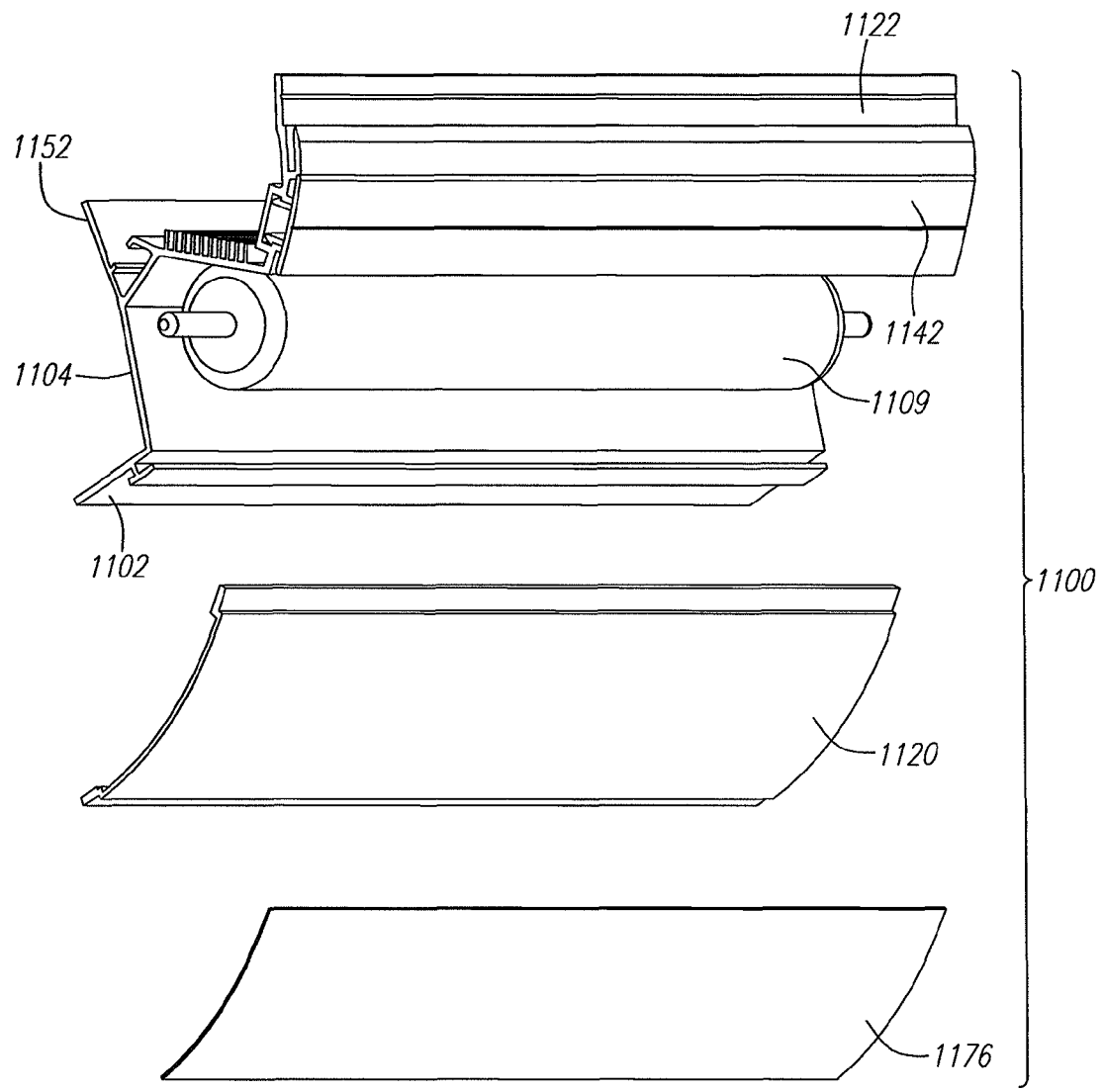

FIGS. 11A through 11C are diagrams illustrating another embodiment of a low glare lighting panel fixture 1100 with a fluorescent lamp tube 1109 for illumination, similar to FIGS. 10A-10C. However, in this embodiment, an anti-glare surface element 1176 is disposed in a manner similar to the embodiment of FIGS. 7A-7C, that is, proximate to the exterior of the light permeable lens cover 1120. In other respects, the various features of the fluorescent lighting panel fixture 1100 of FIGS. 11A-11C are generally similar to the like-numbered features of FIGS. 10A-10C described above, and have similar functionality (i.e., elements "11xx" in FIGS. 11A-11C are similar in nature to elements "10xx" in FIGS. 10A-10C). Thus, for example, in FIGS. 11A-11C are depicted a ceiling panel 1102, a riser panel support 1122, and a removable snap-in lens holder 1142, all having similar functionality to the lighting panel fixture 1000 described with respect to FIGS. 10A-10C (or FIGS. 1A-1C). The fluorescent lighting fixture 1100 further includes a fluorescent lighting mount 1104 for containing the fluorescent lamp tube 1109, which is secured at either end to lamp holding elements as is commonly practiced in the transit vehicle industry. As previously noted, the fluorescent lighting fixture 1100 further includes an anti-glare surface element 1176 disposed proximate to the exterior surface of a light permeable cover 1120, in a similar manner as described with respect to the embodiment of FIGS. 7A-7C, in order to reduce light glare within the interior of the transit vehicle.

Whereas it can be advantageous to include a privacy filter material with the lens cover to reduce glare from a fluorescent light fixture, a light grid as described earlier herein may not be as useful for fluorescent lighting fixtures, as the fluorescent lamp in such a fixture is generally positioned closer to the associated lens cover than are the LEDs, in at least some of the foregoing embodiments. Thus, light from the fluorescent lamp tends to hit the light grid at more of an oblique angle, as compared to the LED lighting fixtures described herein, potentially resulting in a larger reduction of light output.

Any of the lighting fixtures described herein may, but need not, be controlled by an intelligent vehicle control network such as described, for example, in copending U.S. application Ser. No. 11/850,659 filed on Sep. 5, 2007, previously incorporated by reference as if set forth fully herein. As one example, a lighting control system may comprise a subsystem of a larger vehicle control network, and may include a plurality of network nodes including a master node and a series of slave nodes, each of which constitutes or is associated with an LED-based or fluorescent-based lighting fixture having local electronic control but responsive to the master node. A power/data bus may interconnect the series of slave nodes in a daisy-chain fashion. Each of the slave nodes may include a plurality of LEDs, or one or more fluorescent tubes, arranged on a lighting panel or other fixture to provide illumination for a particular interior region of the transit vehicle. A typical transit vehicle, such a passenger bus, may have several lighting panel fixtures (e.g., six fixtures) employed on each side of the vehicle. Commands or inquiries may be transmitted from the master node over a command/data bus to the first slave node, which then propagates the commands or inquiries over the command/data bus to the next slave node in the chain, and so on in sequence until the command or inquiry reaches the last slave node if necessary. Responses may be propagated in the reverse direction along the chain in an analogous manner.

Via commands or inquiries conveyed over the command/data bus, the master node may control, for example, the LEDs of each LED-based lighting fixture. In some embodiments, the master node may command certain LEDs to turn on, turn off, dim by a specified amount, intensify by a specified amount, flash (e.g., in emergency situations), or activate according to a predetermined pattern. Dimming may be accomplished by pulse width modulation, thereby reducing the percentage of time that the LEDs are turned on, and/or by turning off selected LEDs and thereby reducing the number of "on" LEDs at a given time. Likewise, the intensity of light may be increased by increasing the percentage of time that the LEDs are turned on using pulse width modulation, and/or by turning on additional selected LEDs which are initially in an "off" state.

In various embodiments, a transit vehicle configured with lighting fixtures constructed in accordance with the principles and techniques disclosed herein may exhibit a number of advantages and/or useful characteristics. For example, the lighting fixtures may produce less glare on the interior of the vehicle, including particularly the driver's window, and thus increase safety and reduce driver fatigue. The lighting fixtures may also have a long lifetime, particularly the LED-based embodiments, because LEDs can operate up to 100,000 hours or more. As a result, fewer lighting fixtures require replacement over time, as compared to, e.g., fluorescent lighting fixtures, which may reduce maintenance costs (both replacement component costs and service costs). LEDs consume less current than fluorescent lights, typically using about half the power, thus resulting in a significant power savings. Using LEDs may reduce the effects of electromagnetic coupling, and also reduce arcing because the LEDs typically operate off a 12 or 24 Volt supply.

As another potential advantage, LEDs have no filaments or bulbs, and are highly durable. LEDs are generally resistant to vibration, cold, dampness, and salt spray, providing many environmental settings in which the lighting systems disclosed herein may be utilized. An LED-based lighting network may also be more environmentally friendly, as compared with fluorescent, incandescent and neon lighting, in that their construction requires less fossil fuels (required to produce the glass needed to encapsulate incandescent, fluorescent and neon lighting), and potentially environmentally harmful materials (such as Mercury) or gases (such as neon) need not be used in the manufacture of LEDs.

Another advantage of the LED-based lighting systems as disclosed herein is that the LED fixtures and individual LED units may be made any desired length, by, for example, altering the number of LEDs in the array. By contrast, fluorescent lights generally are available in only certain preset sizes, limiting flexibility. Different sized LED-based fixtures may be mixed and matched within a transit vehicle, offering great flexibility in physical layout and arrangement.

Yet another advantage of using LED-based lighting is that the LEDs can be made more directed than incandescent or fluorescent lighting, and can, for example, be targeted downwards towards passenger seating areas. This technique can be used in combination with other techniques disclosed herein to reduce glare that might otherwise occur on the driver's windshield from lighting the passenger seating compartments.

While various embodiments have been described in connection with LED or fluorescent light sources, the same principles may also, in some situations, be applicable to incandescent light sources, although the transit vehicle industry is presently dominated by fluorescent lighting.

The novel techniques described herein may have applicability beyond ground transit vehicles, and may be used, for example, in connection with lighting systems in railcars, airplanes, ships, and the like, or in buildings.

While preferred embodiments of the invention have been described herein, many variations are possible which remain within the concept and scope of the invention. Such variations would become clear to one of ordinary skill in the art after inspection of the specification and the drawings. The invention therefore is not to be restricted except within the spirit and scope of any appended claims.

What is claimed is:

1. A lighting fixture for a transit vehicle, comprising:
   a lighting fixture base for overhead mounting in a conveyance;
   one or more light sources mounted in the lighting fixture base for illuminating the interior of the conveyance; and
   a light permeable front cover attached to the lighting fixture base, said light permeable front cover comprising a lens cover and a light guide for reducing light spread from the one or more light sources;
   wherein said light guide comprises an opaque sheet with perforations for allowing light to pass through from the one or more light sources.

2. The lighting fixture of claim 1, wherein said perforations form a honeycomb grid pattern.

3. The lighting fixture of claim 1, wherein said perforations form a lattice-like grid pattern.

4. The lighting fixture of claim 1, wherein said light permeable front lens cover is arced, and wherein said light guide conforms its shape so to follow the contours of the front lens cover when placed thereon.

5. The lighting fixture of claim 1, wherein said light guide has a thickness within a range of about ⅛" to ¼".

6. The lighting fixture of claim 1, wherein said perforations have a width of approximately ⅛".

7. The lighting fixture of claim 1, wherein said light guide is substantially formed from aluminum or an aluminum alloy.

8. The lighting fixture of claim 1, wherein said one or more light sources comprises a plurality of light-emitting diodes (LEDs).

9. The lighting fixture of claim 8, wherein said lighting fixture base comprises a plurality of compartments separated by interior walls, each compartment having one or more LEDs disposed therein.

10. The lighting fixture of claim 9, wherein said compartments are surfaced with a highly reflective substance.

11. The lighting fixture of claim 10, wherein said highly reflective substance comprises aluminum.

12. The lighting system of claim 1, wherein said one or more light sources comprises at least one fluorescent tube.

13. The lighting system of claim 1, further comprising an anti-glare material affixed to said light permeable front lens cover.

14. A lighting fixture for a transit vehicle lighting system, comprising:
   a lighting fixture base for overhead mounting in a conveyance;
   one or more light sources mounted in the lighting fixture base for illuminating the interior of the conveyance; and
   a light permeable front cover attached to the lighting fixture base, said light permeable front cover comprising a lens cover with anti-glare material disposed thereon for reducing light spread from the one or more light sources;
   wherein said anti-glare material comprises a privacy mesh having a pattern of microlouvers effectively reducing the spread of light from the one or more light sources.

15. The lighting fixture of claim 14, wherein said light permeable front lens cover is arced, and wherein said anti-glare material conforms its shape so to follow the contours of the front lens cover when placed thereon.

16. The lighting fixture of claim 14, wherein said one or more light sources comprises a plurality of light-emitting diodes (LEDs).

17. The lighting fixture of claim 16, wherein said lighting fixture base comprises a plurality of compartments separated by interior walls, each compartment having one or more LEDs disposed therein.

18. The lighting fixture of claim 17, wherein said compartments are surfaced with a highly reflective substance.

19. The lighting system of claim 14, wherein said one or more light sources comprises at least one fluorescent tube.

20. A lighting fixture for a transit vehicle lighting system, comprising:
   a lighting fixture base for overhead mounting in a conveyance;
   one or more light sources mounted in the lighting fixture base for illuminating the interior of the conveyance; and
   a light permeable front cover attached to the lighting fixture base, said light permeable front cover comprising a lens cover with anti-glare material disposed thereon for reducing light spread from the one or more light sources;
   wherein said one or more light sources comprises a plurality of light-emitting diodes (LEDs); and
   wherein said anti-glare material restricts the spread of light from said LEDs to approximately 80 degrees.

21. A lighting fixture for a transit vehicle, comprising:
   a lighting fixture base for overhead mounting in a conveyance;
   a plurality of light-emitting diodes (LEDs) mounted in the lighting fixture base for illuminating the interior of the conveyance; and
   an light permeable front cover attached to the lighting fixture base, said light permeable front cover comprising an arced lens cover and a light guide, curved to follow the contours of said arced lens cover, for reducing light spread from the LEDs;
   wherein said light guide comprises an opaque sheet with perforations for allowing light to pass through from the LEDs, said perforations forming a gridlike pattern.

22. The lighting fixture of claim 21, wherein said perforations form a lattice-like grid pattern.

23. The lighting fixture of claim 21, wherein said perforations form a honeycomb grid pattern.

24. The lighting fixture of claim 21, wherein said light guide has a thickness within a range of about ⅛" to ¼".

25. The lighting fixture of claim 24, wherein said perforations have a width of approximately ⅛".

26. The lighting fixture of claim 21, wherein said light guide is substantially formed from aluminum or an aluminum alloy.

27. The lighting fixture of claim 21, wherein said lighting fixture base comprises a plurality of compartments separated by interior walls, each compartment having one or more LEDs disposed therein, said compartments being surfaced with a highly reflective substance.

* * * * *